(12) United States Patent
Ogirko et al.

(10) Patent No.: US 10,061,961 B2
(45) Date of Patent: Aug. 28, 2018

(54) SENSOR-COMPATIBLE OVERLAY

(71) Applicant: Cypress Semiconductor Corporation, San Jose, CA (US)

(72) Inventors: Roman Ogirko, Lviv (UA); Hans Klein, Pleasanton, CA (US); David G. Wright, Woodinville, WA (US); Igor Kolych, Lviv (UA); Andriy Maharyta, Lviv (UA); Hassane El-Khoury, Pleasanton, CA (US)

(73) Assignee: Cypress Semiconductor Corporation, San Jose, CA (US)

(*) Notice: Subject to any disclaimer, the term of this patent is extended or adjusted under 35 U.S.C. 154(b) by 3 days.

(21) Appl. No.: 15/368,905

(22) Filed: Dec. 5, 2016

(65) Prior Publication Data

US 2017/0147854 A1    May 25, 2017

Related U.S. Application Data

(63) Continuation of application No. 15/088,479, filed on Apr. 1, 2016, now Pat. No. 9,547,788.

(60) Provisional application No. 62/255,220, filed on Nov. 13, 2015.

(51) Int. Cl.
*G06K 9/00* (2006.01)

(52) U.S. Cl.
CPC ....... *G06K 9/0002* (2013.01); *G06K 9/00053* (2013.01)

(58) Field of Classification Search
CPC ...................................................... G06K 9/00

USPC .......................................................... 382/124
See application file for complete search history.

(56) References Cited

U.S. PATENT DOCUMENTS

| | | | |
|---|---|---|---|
| 6,088,471 A | 7/2000 | Setlak et al. | |
| 6,512,381 B2 | 1/2003 | Kramer | |
| 7,028,893 B2 | 4/2006 | Goodman et al. | |
| 8,964,298 B2 | 2/2015 | Haddick et al. | |
| 2008/0093687 A1* | 4/2008 | Antaki | G06K 9/0002 257/415 |
| 2011/0102569 A1 | 5/2011 | Erhart | |
| 2013/0265040 A1* | 10/2013 | Ide | G01R 15/205 324/252 |
| 2014/0063374 A1* | 3/2014 | Kuriki | G06F 3/044 349/12 |
| 2015/0071509 A1 | 3/2015 | Myers | |
| 2016/0357316 A1* | 12/2016 | Koizumi | G06F 1/1626 |

OTHER PUBLICATIONS

"News Briefs: Biometric Fingerprint Reader Works Through Latex Gloves," published on Jul. 1, 2011 [retrieved on Mar. 29, 2016], retrieved from internet <URL: http://www.locksmithledger.com/>.
International Search Report for International Application No. PCT/US16/61273 dated Dec. 15, 2016; 4 pages.

(Continued)

*Primary Examiner* — Gregory F Cunningham

(57) ABSTRACT

A sensor-compatible overlay is disclosed which uses anisotropic conductive material to increase capacitive coupling of a conductive object through the overlay material to a capacitive sensor. The anisotropic conductive material has increased conductivity in a direction orthogonal to the capacitive sensor. In one embodiment, the overlay is configured to enclose a device which includes a capacitive sensor. In another embodiment, the overlay is configured as a glove.

26 Claims, 24 Drawing Sheets

(56) References Cited

OTHER PUBLICATIONS

USPTO Non-Final Rejection for U.S. Appl. No. 15/088,479 dated Jun. 28, 2016; 18 pages.
USPTO Notice of Allowance for U.S. Appl. No. 15/088,479 dated Sep. 7, 2016; 9 pages.
Written Opinion of the International Searching Authority for International Application No. PCT/US16/61273 dated Dec. 15, 2016; 8 pages.

* cited by examiner

SENSOR-COMPATIBLE OVERLAY

RELATED APPLICATION

This is a Continuation Application of U.S. patent application Ser. No. 15/088,479, filed on Apr. 1, 2016, which claims the benefit of U.S. Provisional Patent Application No. 62/255,220, filed Nov. 13, 2015, all of which are incorporated by reference herein in their entirety.

TECHNICAL FIELD

The present disclosure relates generally to fingerprint sensing, and more particularly to the sensing of a fingerprint through an overlay material.

BACKGROUND

Various devices and systems such as computing devices (e.g., notebook computers, tablets, personal digital assistants, smartwatches, mapping devices, audio players), mobile communication devices (e.g., smartphones, cellphones), automotive equipment (e.g., cars, trucks, motorcycles), industrial equipment (e.g., machinery, tools), home white goods (e.g., appliances, security systems), and entry systems (e.g., home entry, automotive entry, secure area entry) may require an authentication method to protect against unauthorized access. Fingerprint authentication using fingerprint sensors may protect an apparatus or system against unauthorized access.

Fingerprint sensors may use various capacitive sensing methods to image a fingerprint pattern, where imaging a fingerprint means detecting a fingerprint and generating a set of data values, or "fingerprint data," that represents the fingerprint in digital format. The fingerprint data may be an image or other information specific to a fingerprint. This method requires direct contact or close proximity of the portion of the finger comprising the fingerprint, or "finger pad," with the sensor surface. A very thin cover, or overlay, may be disposed over the sensor surface. Overlays may typically be less than 150 µm in thickness. Thick covers or overlays between the fingerprint and the fingerprint sensor may obscure fingerprint features.

There may be a variety of situations when a user wearing a glove or other hand enclosure may want to image a fingerprint. A glove may protect the hand against harmful environmental factors, such as cold and water, and harmful physical factors, such as sharp objects and corrosive chemicals. A glove may be fabricated using material such as, but not limited to, fabric, latex, or rubber. Current fingerprint sensors cannot image fingerprints through glove materials. Using glove materials that are thin enough to enable fingerprint sensing may limit the protective effectiveness of the materials. If using thick glove materials, the user may have to remove the glove to image a fingerprint, which may be inconvenient and/or dangerous. It is desirable to create a glove or other hand enclosure using materials that are thick enough for protection but enable a fingerprint sensor to accurately image a fingerprint.

Similarly, devices with fingerprint sensors are often enclosed in a protective enclosure, or the front face of the device is covered by a protective cover. A protective enclosure or cover protects the device and/or sensor against harmful environmental factors, such as cold and water, and harmful physical factors, such as sharp objects and corrosive chemicals. A protective enclosure or cover may be fabricated with rigid material, such as, but not limited to, glass or plastic, or flexible material, such as, but not limited to, fabric or film. A protective enclosure may completely enclose a device or may partially enclose a device. Current fingerprint sensors cannot image fingerprints through thick material. Using an enclosure or cover material that is thin enough to enable fingerprint sensing may limit the protective effectiveness of the enclosure or film. If using a thick enclosure or cover material, the user may have to remove the device from the enclosure or cover to enable fingerprint sensing. Removing the cover or enclosure may be inconvenient for the user and and/or may risk damaging the device. It is desirable to create a protective enclosure or cover made of material that is thick enough for protection but enables a fingerprint sensor to accurately image a fingerprint.

SUMMARY

In an embodiment, a method is disclosed for constructing using material that is thick enough for protection but enables a fingerprint sensor to accurately image a fingerprint through the overlay. The method includes incorporating an anisotropic conductive material into the portion of the overlay disposed over the fingerprint sensor. The anisotropic conductive material is substantially more conductive in one direction, such as a direction orthogonal to the surface of a fingerprint sensor, than in other directions, increasing the capacitive coupling of the fingerprint to the sensor surface, allowing the fingerprint sensor to accurately image the fingerprint.

In an embodiment, a method is disclosed for constructing a protective enclosure or cover using material that is thick enough for protection but enables a fingerprint sensor to accurately image a fingerprint without removing the protective enclosure or cover. The method includes incorporating an anisotropic conductive material into the portion of the protective enclosure or cover disposed over the fingerprint sensor. The anisotropic conductive material is substantially more conductive in one direction, such as a direction orthogonal to the surface of a fingerprint sensor, than in other directions, increasing the capacitive coupling of the fingerprint to the sensor surface, allowing the fingerprint sensor to accurately image the fingerprint.

In an embodiment, a method is disclosed for constructing a glove or other hand enclosure using material that is thick enough for protection but enables a fingerprint sensor to accurately image a fingerprint without taking off the glove or hand enclosure. The method includes incorporating an anisotropic conductive material into a fingertip area of a glove or hand enclosure. The anisotropic conductive material is substantially more conductive in a direction orthogonal to the surface of a finger pad, increasing the capacitive coupling of the fingerprint to the sensor surface, allowing the fingerprint sensor to accurately image the fingerprint.

In an embodiment, an overlay is disclosed. The overlay incorporates an anisotropic conductive material into a portion of the overlay disposed over a fingerprint sensor. The anisotropic conductive material is substantially more conductive in a direction orthogonal to the surface of a fingerprint sensor, increasing the capacitive coupling of the fingerprint to the sensor surface, allowing the fingerprint sensor to accurately image the fingerprint.

In an embodiment, a protective enclosure or cover is disclosed. The enclosure or cover incorporates an anisotropic conductive material into a portion of the protective enclosure or cover disposed over a fingerprint sensor. The anisotropic conductive material is substantially more conductive in a direction orthogonal to the surface of a fingerprint sensor, increasing the capacitive coupling of the fingerprint to the sensor surface, allowing the fingerprint sensor to accurately image the fingerprint.

In an embodiment, a glove or other hand enclosure is disclosed. The glove or hand enclosure incorporates an anisotropic conductive material into a fingertip area of the glove or hand enclosure. The anisotropic conductive material is substantially more conductive in a direction orthogonal to the surface of a finger pad, increasing the capacitive coupling of the fingerprint to the sensor surface, allowing the fingerprint sensor to accurately image the fingerprint.

DETAILED DESCRIPTION

Figure 1:
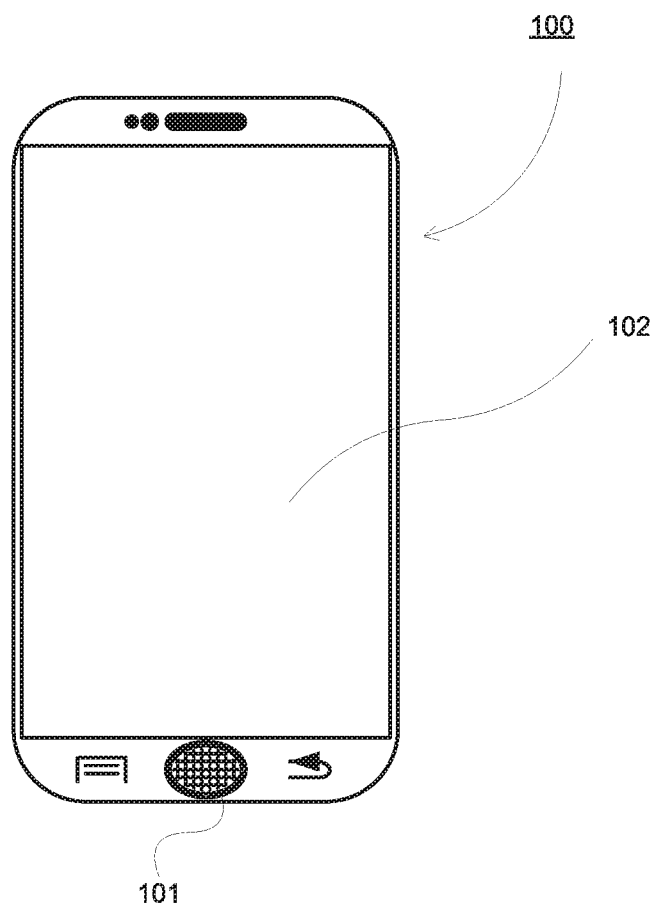
FIG. 1 illustrates a device with a fingerprint-enabled authentication system.

In the following description, for purposes of explanation, numerous specific details are set forth in order to provide a thorough understanding of the embodiments of the present invention discussed herein. It will be evident, however, to one skilled in the art that these and other embodiments may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

For simplicity and clarity of illustration, reference numerals may be repeated among the figures to indicate corresponding or analogous elements. Numerous details are set forth to provide an understanding of the embodiments described herein. The examples may be practiced without these details. In other instances, well-known methods, procedures, and components are not described in detail to avoid obscuring the examples described. The description is not to be considered as limited to the scope of the examples described herein.

Fingerprint Sensing and Imaging

FIG. 1 illustrates an embodiment of a device 100 with a fingerprint-enabled authentication system. Device 100 may be a mobile communication device such as a smartphone, cellphone, or tablet, comprising a fingerprint sensor 101 which may enable user access to device applications. Surface 102 may be a display or touchscreen. Other embodiments of devices or systems system with a fingerprint-enabled authentication systems may include an automotive console comprising a fingerprint sensor to enable the user to start the engine, an industrial control pad comprising a fingerprint sensor which may enable the user to operate the equipment, a home security console comprising a fingerprint sensor which may enable the user to arm or disarm the system, an entry pad comprising a fingerprint sensor which may enable a user to enter a secure area, and an automotive door entry pad comprising a fingerprint sensor which may enable the user to lock or unlock the automobile.

In each device or system, a fingerprint may be imaged using a fingerprint sensor 101, where imaging a fingerprint may comprise detecting a fingerprint and generating a set of data values, or "fingerprint data," that represents the fingerprint in digital format. The fingerprint data may then be stored in a memory location. A second fingerprint may subsequently be imaged. The first set and second set of fingerprint data may be compared to determine if they share fingerprint features. Upon determining the two sets of fingerprint data share a significant number of features, the device may enable the user to access the device or system.

Fingerprint sensors may comprise a capacitive fingerprint sensor array. A capacitive fingerprint sensor array refers to a sensor array that includes capacitive sense elements that may produce signals suitable for detecting, determining positions of, tracking, and/or imaging the features of the fingerprint on or near a sensing surface. A capacitive sense element may comprise an electrode, a discrete unit of electrodes, or an intersection of electrodes from which a measurement or signal may be obtained that is separate and distinct from measurements/signals obtained from other sense elements in the capacitive sensor array. A unit cell refers to a discrete area of the capacitive sensor array in which every point within the unit cell is closer to one sense element than to an adjacent sense element.

Capacitive fingerprint sensors function by measuring the capacitance of a capacitive sense element and detecting a change in capacitance indicating a presence or absence of fingerprint features. Fingerprint features may include, but are not be limited to, valleys and ridges forming arches, loops, and whorls. For example, when a fingerprint ridge comes into contact with or is in close proximity to a sense element, the capacitance change caused by the fingerprint ridge may be detected. The capacitance change of the sense elements may be measured by electrical circuitry that converts the capacitances measured from the capacitive sense elements into digital values from which fingerprint data may be derived. As used herein, "fingerprint data" refers to a set of data values that represent a fingerprint in digital format. In some embodiments, fingerprint data may be a dataset that visually represents the valleys and ridges of a fingerprint with their arches, loops, and whorls. In other embodiments, fingerprint data may digitally represent a fingerprint in a non-visual form.

Figure 2:
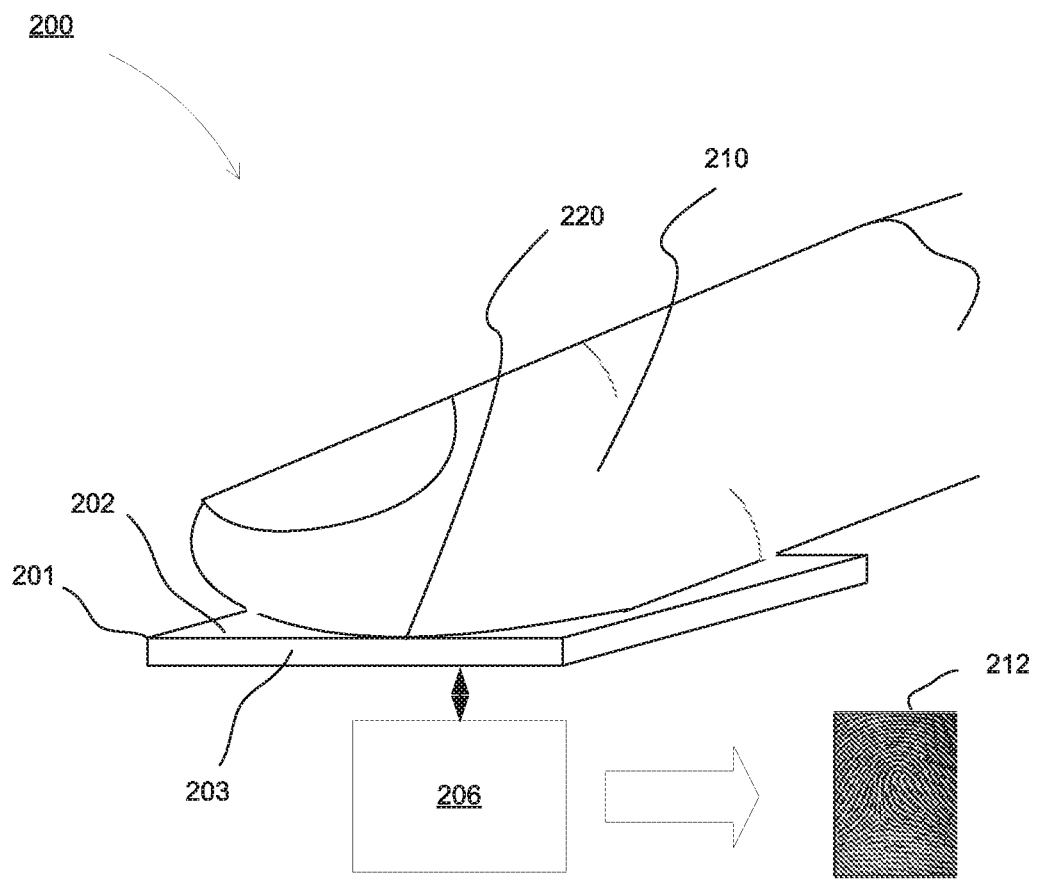
FIG. 2 illustrates a fingerprint sensing system.

FIG. 2 illustrates a fingerprint sensing system 200 in accordance with various embodiments. The fingerprint sensing system 200 includes a fingerprint sensor 201 and a fingerprint controller 206. Fingerprint sensor 201 may include a surface 202. A portion of finger 210 comprising a fingerprint, or "finger pad," 220 may be disposed on or in close proximity to surface 202. Fingerprint sensor 201 comprises an array of capacitive sensors 203 (not shown). Surface 202 may be disposed over array 203, which experiences changes in capacitance in response to the contact or proximity of fingerprint features of finger 210. Surface 202 may protect the capacitive sense elements from damage caused by direct physical contact by finger 210 or other objects. Surface 202 may also protect capacitive sense elements 203 from harmful environmental factors, such as cold or water, and harmful physical factors, such as impacts, projectile objects, and corrosive chemicals. Fingerprint sensor 201 and/or sensor surface 202 may be in the shape of a square, rectangle, circle, or any other shape. Fingerprint sensor 201 may be coupled to controller 206. Controller 206 may be configured to receive voltage or current signals measured by capacitive sense elements 203 which correspond to measured capacitance on and/or between capacitive sense elements 203, and to convert the voltage or current signals to fingerprint data, represented by visual representation of a fingerprint 212.

Figure 3:
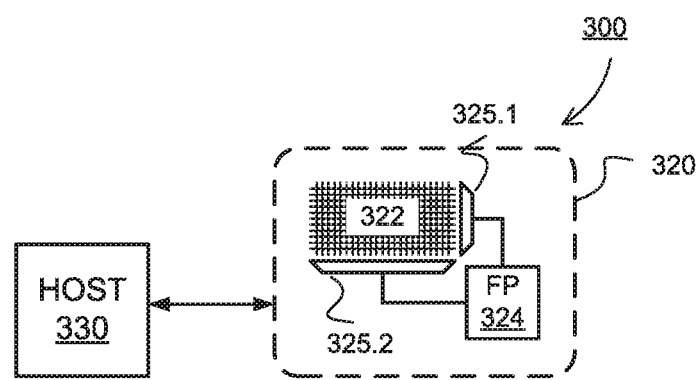
FIG. 3 illustrates a system that includes a fingerprint imaging module.

FIG. 3 illustrates an embodiment of a system 300 that includes a fingerprint imaging module 320. Fingerprint imaging module 320 may include an array 322 of capacitive sense elements (203 of FIG. 2) that are disposed in a location accessible to a user's finger. Array 322 may be disposed beneath a cover layer corresponding to surface 202 of FIG. 2. The capacitive sense elements 203 of array 322 may be coupled to a fingerprint controller 324 through multiplexors 325.1 and 325.2. Fingerprint controller 324 may be configured to receive voltage or current signals measured by sense elements (203 of FIG. 2) of array 322 which correspond to measured capacitance on and/or between electrodes of sense elements (203 of FIG. 2), and convert the voltage or current signals into fingerprint data. Fingerprint data may then be passed to host 330 for further processing, to store the fingerprint data in a library, or to compare the fingerprint data to one of a library of stored fingerprint data corresponding to one or more fingerprint images. The library of stored fingerprint data may be stored in a memory, which may be integrated with fingerprint controller 324, host 330, or as a separate circuit element (not shown).

In various embodiments, portions of system 300 may be integrated into different devices. For example, in an embodiment, sensor array 322, fingerprint controller 324 and host 330 may be on the same integrated circuit. In another embodiment, sensor array 322 may be on one integrated circuit and the detection and imaging portions (logic) of each controller may be on separate integrated circuits. All the digital processing may be executed on a single controller, such as the host, or, in other embodiments, the processing may be distributed to different controllers in the system.

Figure 4:
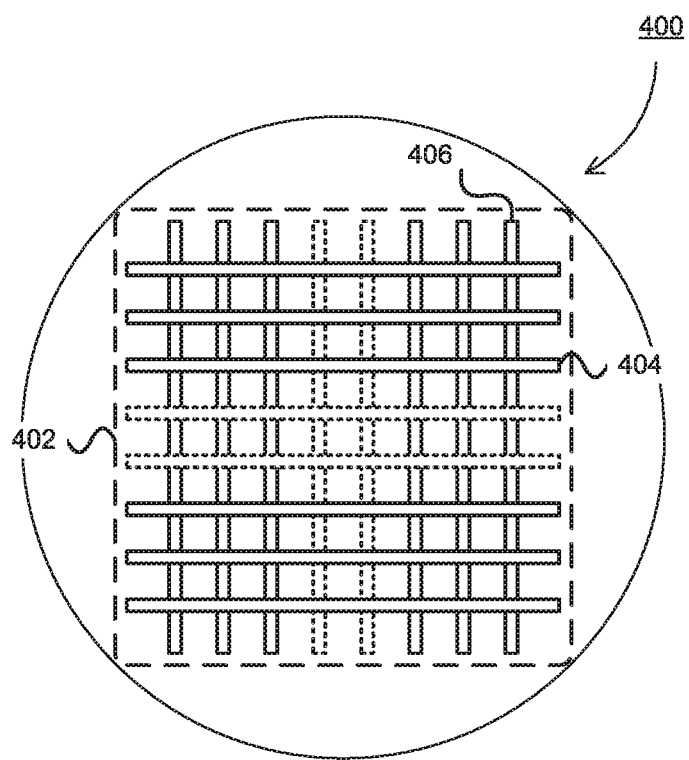
FIG. 4 illustrates a capacitive sensor array suitable for detecting and imaging fingerprints.

FIG. 4 illustrates an embodiment of a capacitive sensor array 400 suitable for detecting and imaging fingerprints. Capacitive sensor array 400 may include a number of electrodes arranged in an array 402 of row electrodes 404 in a first axis and column electrodes 406 in a second axis. FIG. 4 illustrates eight row electrodes 404 and eight column electrodes 406, but there may be considerably more electrodes disposed along both axes. Depending on the size of the array, there may be dozens or hundreds of electrodes for each row and column. The exact size and pitch of the electrodes may depend on the system design requirements.

A fingerprint sensor system as illustrated in FIGS. 2-4 may include certain features to enable accurate imaging of a fingerprint. In an embodiment, the pitch of row electrodes and column electrodes may be small enough such that multiple rows or columns may be disposed within a valley or along a ridge of a fingerprint feature when a finger is in contact with, or in close proximity to, a fingerprint sensor surface. In some embodiments, the pitch may be selected such that each fingerprint feature may be detected by a minimum number of capacitive sense elements (e.g., at least three capacitive sense elements). In various embodiments, the pitch of the capacitive sense elements may be less than 100 μm.

In an embodiment, the sensor surface of the fingerprint sensor may be a size that allows imaging of an adequate number of fingerprint features to allow differentiation between one fingerprint and another. In various embodiments, the area of the sensor surface of the fingerprint sensor may be in the range from 4×4 mm to 12×12 mm.

The thickness of the fingerprint sensor surface, or the thickness of an overlay disposed over the sensor surface, may affect the change in measured capacitance of a capacitive sense element in response to a proximate fingerprint feature. The change in capacitance that may be measured in response to a fingerprint feature is around 0.05 fF. For example, a thick sensor surface or overlay may reduce the change in measured capacitance of a capacitive sense element in response to a proximate fingerprint feature, which may obscure the fingerprint details.

Anisotropic Conductive Material

The sensor surface of a capacitive fingerprint sensor, or an overlay disposed on the sensor surface, may typically be made of an isotropic conductive material. In other words, the conductivity of the material is substantially the same in all directions. In an embodiment, the sensor surface or overlay may be made of an anisotropic conductive material. Anisotropic conductive material may be substantially more conductive in one direction, such as a direction orthogonal to a fingerprint sensor surface, than in other directions.

Figure 5A:
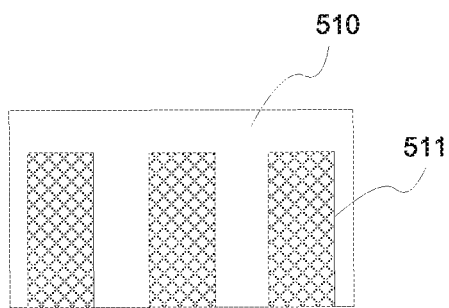
FIG. 5 illustrates a material with pillars that are fabricated partly through the material in one direction according to an embodiment.
Figure 5B:
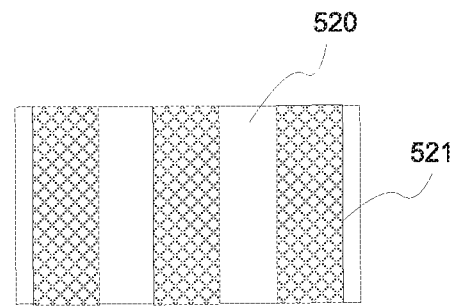

One method of fabricating anisotropic conductive material may to fabricate conductive pathways, or "pillars," in a material. FIG. 5A illustrates a material 510 with pillars 511 that are fabricated partly through the material in one direction. FIG. 5B illustrates a material 520 with through-material pillars 521 that are fabricated from one surface of the material to the other in one direction. Through-material pillars may be preferable in some embodiments because they may provide uniform depth and conductivity. The pillars may be fabricated by methods including, but not limited to, drilling, piercing, or perforating a material. The pillars may be areas within the material that are devoid of the material. The pillars may be fully or partially filled with air, dielectric material, or a conductive material. Pillars may be filled with material by methods including, but not limited to, electroplating or depositing micro-particles. The presence of pillars in a material increases conductivity in the direction of the pillars.

Figure 6A:
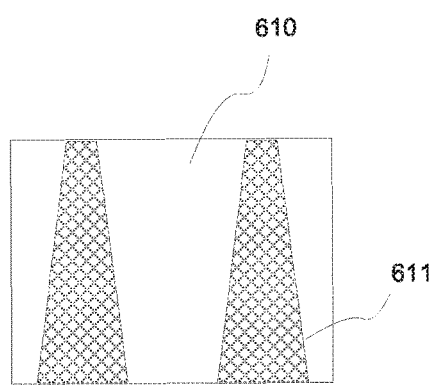
FIG. 6A illustrates a material with pillars formed in the shape of a cone according to an embodiment.
Figure 6B:
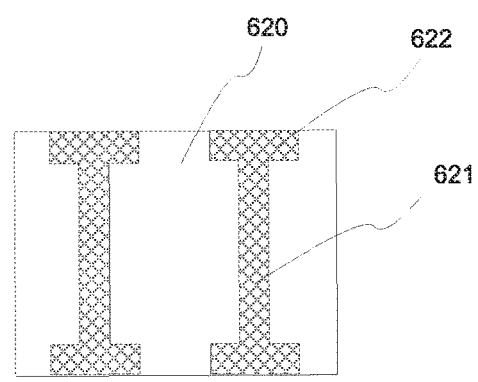
FIG. 6B illustrates a material with pillars formed in the shape of a cylinder with plates at each end according to an embodiment.

FIGS. 5A and 5B illustrate pillars 511 and 521 formed in the shape of a cylinder. FIG. 6A illustrates a material 610 with pillars 611 formed in the shape of a cone. FIG. 6B illustrates a material 620 with pillars 621 formed in the shape of a cylinder with plates 622 at each end. A cylinder with one or two plates 622 may have smaller capacitive coupling to neighboring pillars than simple cylinders (such as pillar 521 of FIG. 5B), while providing large areas at each surface for strong coupling to a fingerprint and a fingerprint sensor. In other embodiments, the pillars may be formed in other shapes.

Figure 7A:
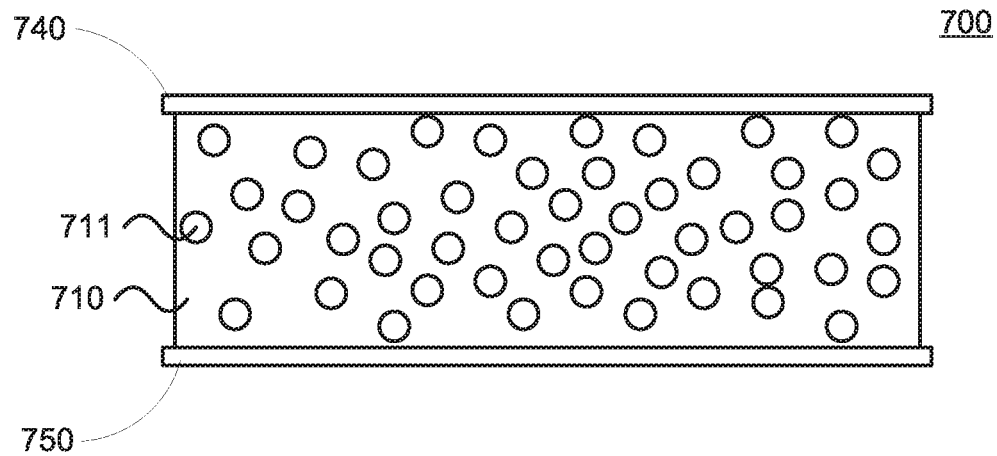
FIG. 7A illustrates a material in which conductive elements have been randomly incorporated into a material according to an embodiment.
Figure 7B:
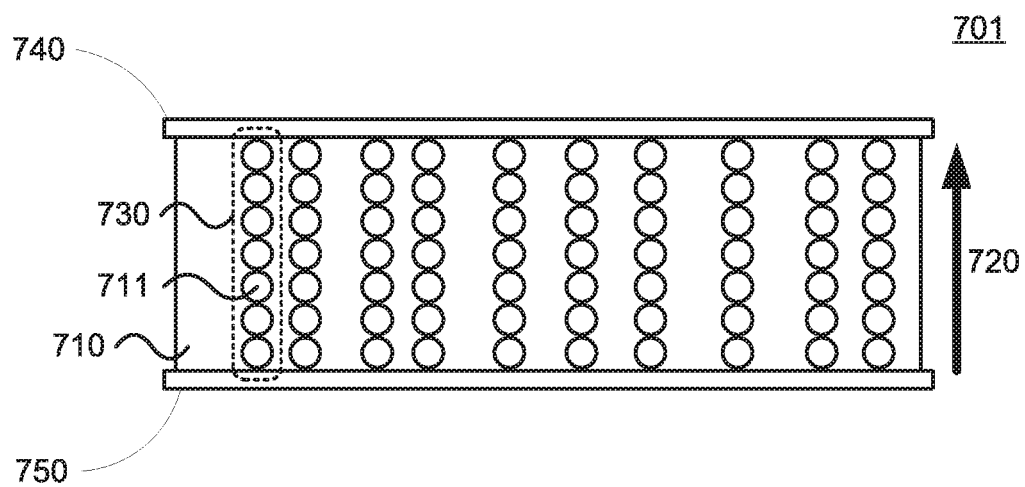
FIG. 7B illustrates a material after an electric or magnetic field force has been applied in a direction according to an embodiment.

FIGS. 7A and 7B illustrate another method to fabricate anisotropic conductive material by mixing conductive elements in a material. FIG. 7A illustrates a material 710 in which conductive elements 711 have been randomly incorporated. In an embodiment, the embedded conductive particles may be less than 20 μm in diameter. FIG. 7B illustrates material 710 after an electric or magnetic field force 720 has been applied across material 710 during a manufacturing step. Electric or magnetic field 720 may be applied in a direction substantially orthogonal to material surface 740 and material surface 750. The direction of applied electric or magnetic field 720 is indicated by the arrow. The electric or magnetic field force may align conductive elements 711 in the direction of the applied electric or magnetic field 720, thus forming the equivalent of "pillars" 730 aligned in the direction of the applied electric or magnetic field 720. Thus, material 710 will have increased conductivity in the alignment direction of pillars 730. In a specific embodiment, the conductive elements are ferro-electric conductive particles and a magnetic field has been applied. In other embodiments, other conductive elements 711 such as conductive filaments may be used. In other embodiments, conductive elements 711 may be aligned to form the equivalent of pillars 730 by applying an electric field across material 710 in a direction substantially orthogonal to material surface 740 and material surface 750. In still other embodiments, conductive elements 711 may be aligned to form the equivalent of pillars 730 by applying pressure across material 710 in a direction substantially orthogonal to material surface 740 and material surface 750

Anisotropic conductive material may be fabricated with rigid materials including, but not limited to, glass, ceramic, or plastic. Anisotropic conductive material may be fabricated with non-rigid materials including, but not limited to, film or fabric. A specific embodiment of a material comprising conductive elements that may be aligned in a direction of an applied electric or magnetic field is Anisotropic Conductive Film by 3M Corporation.

Anisotropic Conductive Material and Fingerprint Sensing

Figure 8A:
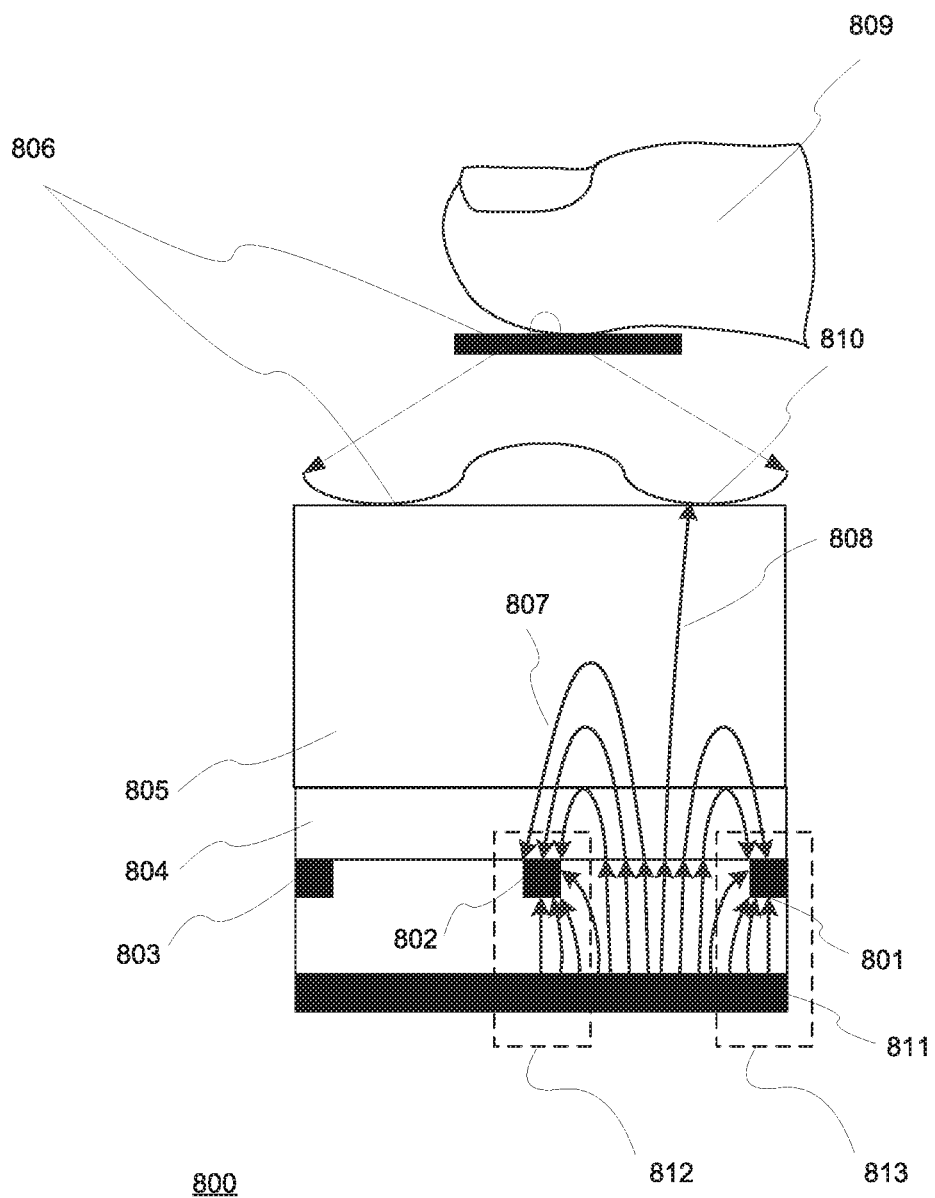
FIG. 8A-8B illustrates the effect of anisotropic conductive material on the electric field density of a capacitive fingerprint sensor according to various embodiments.
Figure 8B:
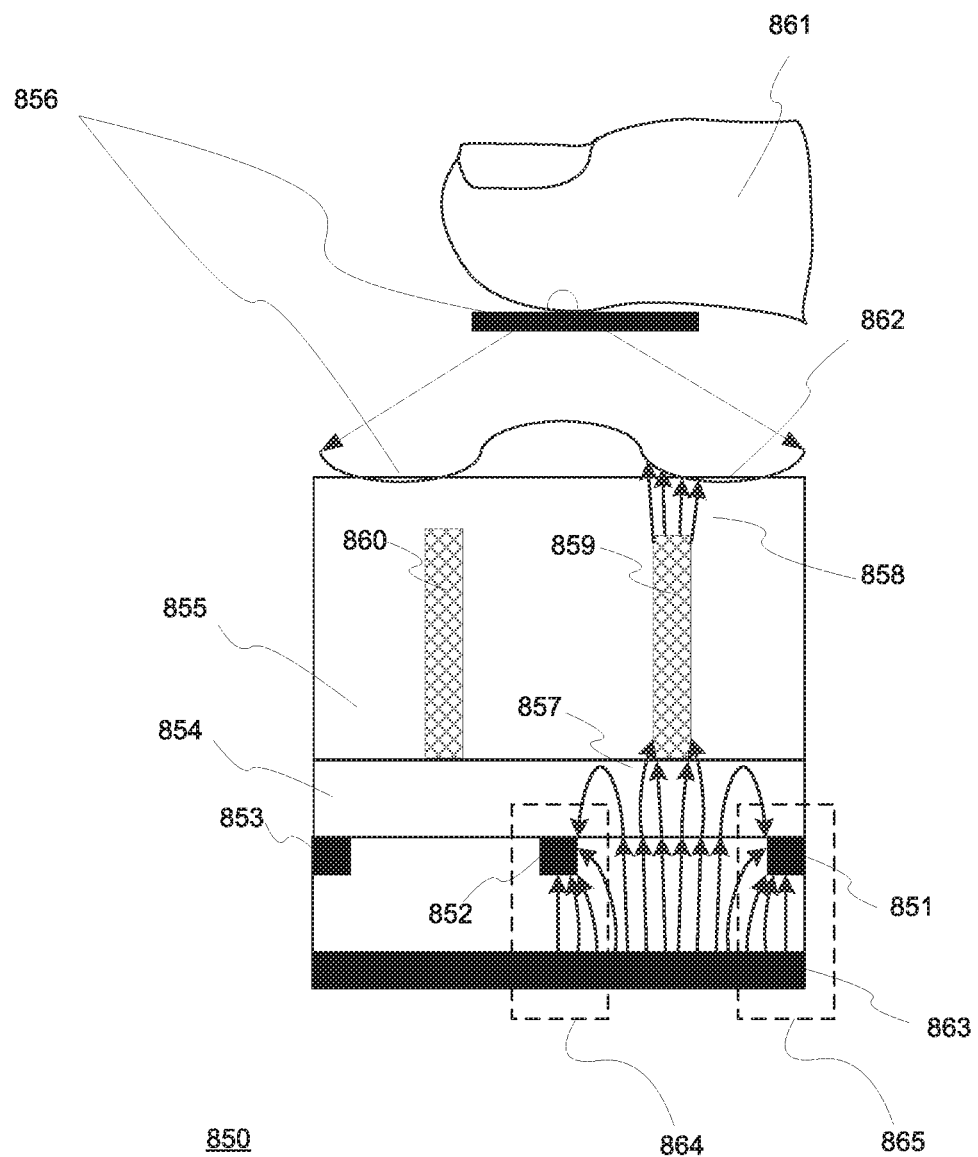

FIGS. 8A and 8B illustrate the effect of pillars in anisotropic conductive material on the electric field density of a capacitive fingerprint sensor which is imaging a fingerprint. FIG. 8A illustrates a mutual capacitance fingerprint sensor 800 comprising Tx electrode 811, Rx electrodes 801, 802, and 803, sensor surface 804, and overlay material 805. In this example, a sense element comprises the intersection of Tx electrode 811 and an Rx electrode 801, 802, or 803. Sense element 812 comprises the intersection of Tx electrode 811 and Rx electrode 802; sense element 813 comprises the intersection of Tx electrode 811 and Rx electrode 801. In this example, Rx electrodes 801, 802, and 803 correspond to column electrodes 404 in FIG. 4, and Tx electrode 811 corresponds to column electrodes 406 in FIG. 4. Mutual capacitance fingerprint sensor 800 measures the change in mutual capacitance of sense elements 812 or 813 in the presence of finger 809 on a surface 806 of overlay material 805. The magnitude of the decrease in mutual capacitance measured by sense elements 812 and 813 is represented by the number of field lines 807 which couple from Tx electrode 811 to finger 809 instead of coupling to Rx electrodes 801 and 802. In this example, the field lines are an abstraction of the strength of capacitive coupling between sense elements 812 and 813 and finger 809. FIG. 8A illustrates that fingerprint ridge 810 is weakly coupled to sense elements 812 and 813 through material 805, causing a slight decrease in measured mutual capacitance, as represented by the single field line 808 that is shunted away from sense elements 812 and 813 to ridge 810.

FIG. 8B illustrates a mutual capacitance fingerprint sensor 850 comprising Tx electrode 863, Rx electrodes 851, 852, and 853, sensor surface 854, and overlay material 855. In this example, a sense element comprises the intersection of Tx electrode 863 and an Rx electrode 851, 852, or 853. Sense element 864 comprises the intersection of Tx electrode 863 and Rx electrode 852; sense element 864 comprises the intersection of Tx electrode 811 and Rx electrode 851. Overlay material 855 comprises pillars 859 and 860. The magnitude of the decrease in mutual capacitance measure by sense elements 864 and 865 in the presence of finger 861 on a surface 856 of the overlay material is represented by the number of field lines 858 which couple from Tx electrode 863 to finger 861 instead of coupling to Rx electrodes 864 and 865. FIG. 8B illustrates that fingerprint ridge 862 is strongly coupled to sense elements 864 and 865 through pillar 859, causing a decrease in measured mutual capacitance, as represented by the four field lines 858 that are coupled away from sense elements 864 and 865 to ridge 862 through pillar 859. In other words, pillar 859 acts as an electric field guide that increases the capacitive coupling of fingerprint ridge 862 to the sense elements 864 and 865, and increases the change in measured capacitance of sense elements 864 and 865. The increase in the magnitude of the decrease in measured mutual capacitance using material 855 comprising pillars 859 and 860 compared to material 805 without pillars is represented by the increase in the number of field lines 857 that are coupled away from sense elements 864 and 865 to fingerprint ridge 862. In the examples of FIGS. 8A and 8B, the increase using material 855 with pillars 859 and 860 is represented by the four field lines 858 compared to the one field line 808 for material 805 without pillars. It is to be understood that conductively anisotropic material may similarly be used with self-capacitance fingerprint sensors where the increased capacitive coupling of the pillar causes an increase in the measured change in capacitance by sense elements.

Figure 9A:
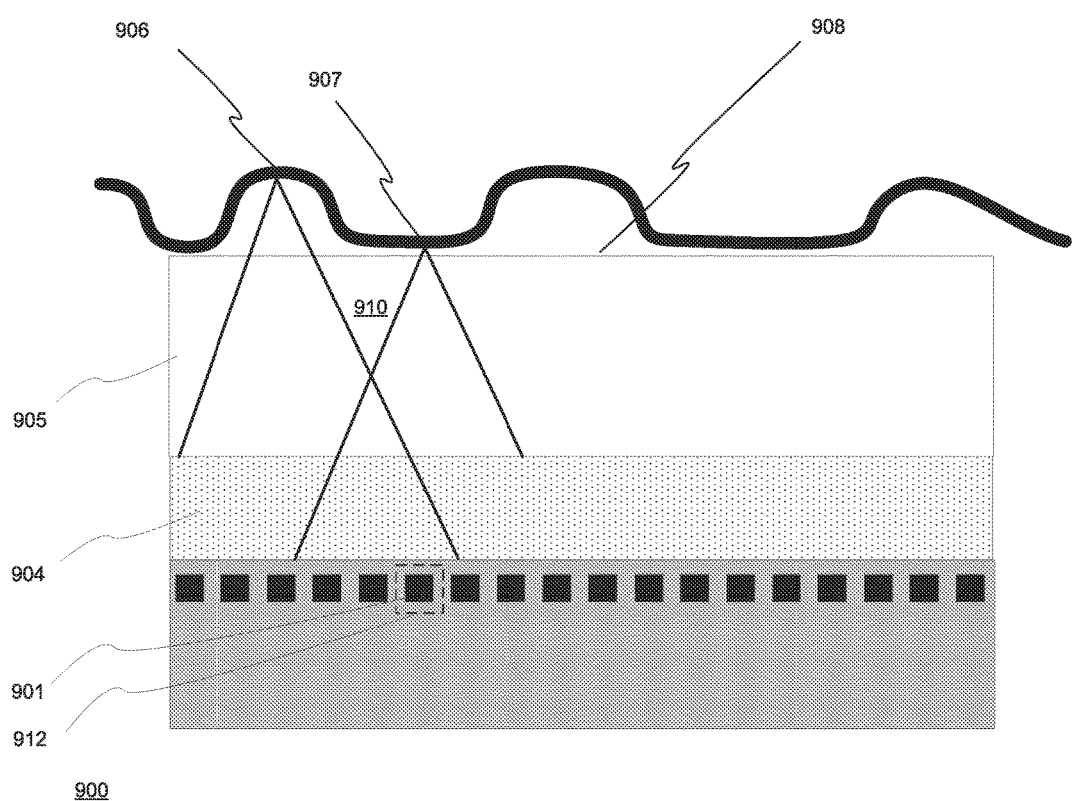
FIGS. 9A-9B illustrate the effect of anisotropic conductive material on the imaging of a fingerprint by a fingerprint sensor according to various embodiments.
Figure 9B:
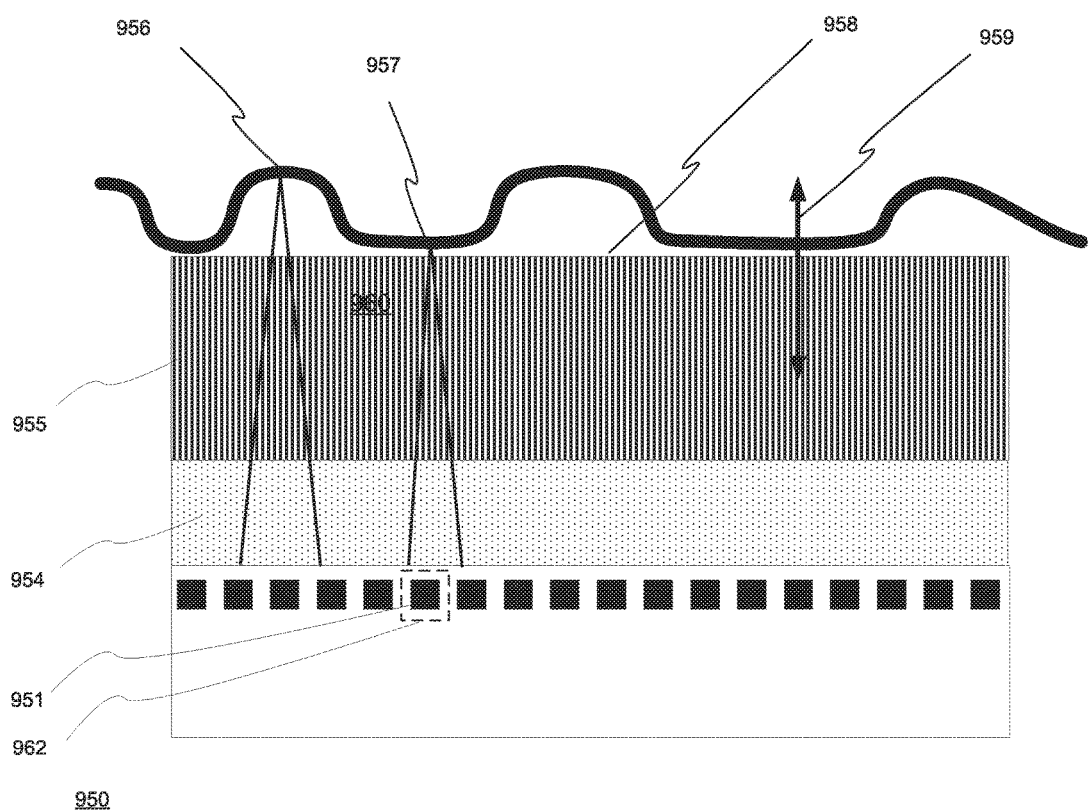

FIGS. 9A and 9B illustrate another example of the effect of anisotropic conductive material on the imaging of a fingerprint by a fingerprint sensor. FIG. 9A illustrates a self capacitance fingerprint sensor 900 comprising electrode 901, sensor surface 904, and overlay material 905. In this example, sense element 912 comprises electrode 901. Self capacitance fingerprint sensor 900 measures the change in self capacitance of sense element 912 in the presence of fingerprint feature 906, corresponding to a fingerprint valley, and fingerprint feature 907, corresponding to a fingerprint ridge, on surface 908 of overlay material 905. Fingerprint features 906 and 907 disperse as they capacitively couple through overlay material 905 to sense element 912. The dispersion of fingerprint features 906 and 907 through overlay material 905 is represented by lines 910. In this example, lines 910 are an abstraction of the dispersion of fingerprint features 906 and 907 through overlay material 905 to sense elements 912. FIG. 9A illustrates that dispersion of fingerprint features 906 and 907 through overlay material 905 may enable each fingerprint feature 906 and 907 to capacitively couple to multiple sense elements 912, and also may enable sense element 912 to capacitively couple to multiple fingerprint features 906 and 907. Increasing the number of fingerprint features 906 and 907 that capacitively couple to a sense element 912, or increasing the number of sense elements 912 that capacitively couple to each of fingerprint features 906 and 907, reduces the accuracy of fingerprint imaging by sense element 912 and, therefore, by fingerprint sensor 900.

FIG. 9B illustrates a self capacitance fingerprint sensor 950 comprising electrode 951, sensor surface 954, and anisotropic conductive material 955. The direction of increased conductivity in anisotropic conductive material 955 is represented by arrow 959. In this example, sense element 962 comprises electrode 951. Self capacitance fingerprint sensor 950 measures the change in self capacitance of sense element 962 in the presence of fingerprint features 956 and 957 on surface 958 of anisotropic conductive material 955. Fingerprint features 956 and 957 may disperse as they capacitively couple through anisotropic conductive material 955 to sense element 962. The dispersion of fingerprint features 956 and 957 through anisotropic conductive material 955 is represented by lines 960. FIG. 9B illustrates that dispersion of fingerprint features 956 and 957 through anisotropic conductive material 955 is less than dispersion of dispersion of fingerprint features 906 and 907 through overlay material 905 as illustrated in FIG. 9A. The pillars (not shown) of anisotropic conductive material 955 may act like electric field guides that decrease the dispersion of the fingerprint features as sensed by sense element 962. Reducing the dispersion of fingerprint features 956 and 957 may enable each fingerprint feature 956 and 957 to capacitively couple to fewer sense elements 962, and may enable each sense element 962 to capacitively couple to fewer fingerprint features 956 and 957, thus increasing the accuracy of fingerprint imaging by fingerprint sensor 950. It is to be understood that conductively anisotropic material may similarly be used with mutual capacitance fingerprint sensors where the reduced dispersion of fingerprint features may also enable each fingerprint feature to capacitively couple to fewer sense elements 962, and may enable each sense element to capacitively couple to fewer fingerprint features, thus increasing the accuracy of fingerprint imaging by the mutual fingerprint sensor.

Figure 10A:
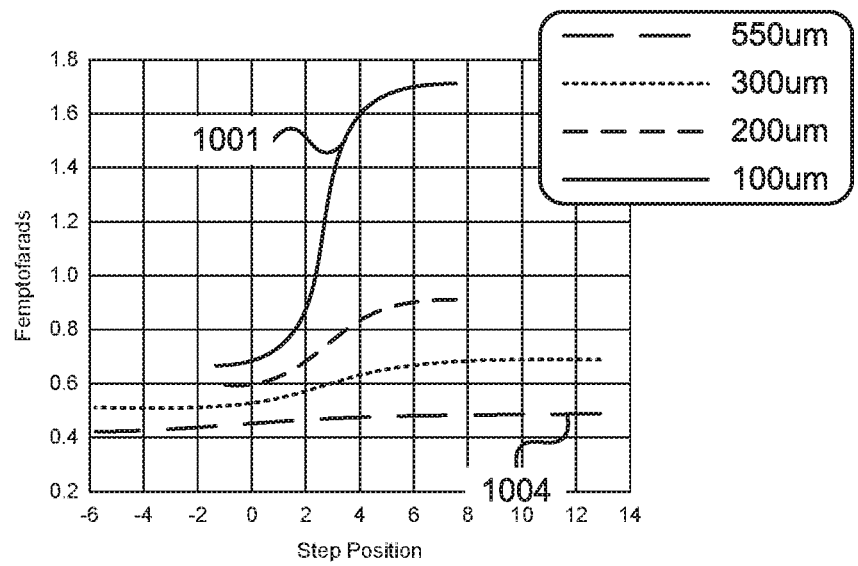
FIG. 10A is a graph illustrating measured capacitance according to an embodiment.
Figure 10B:
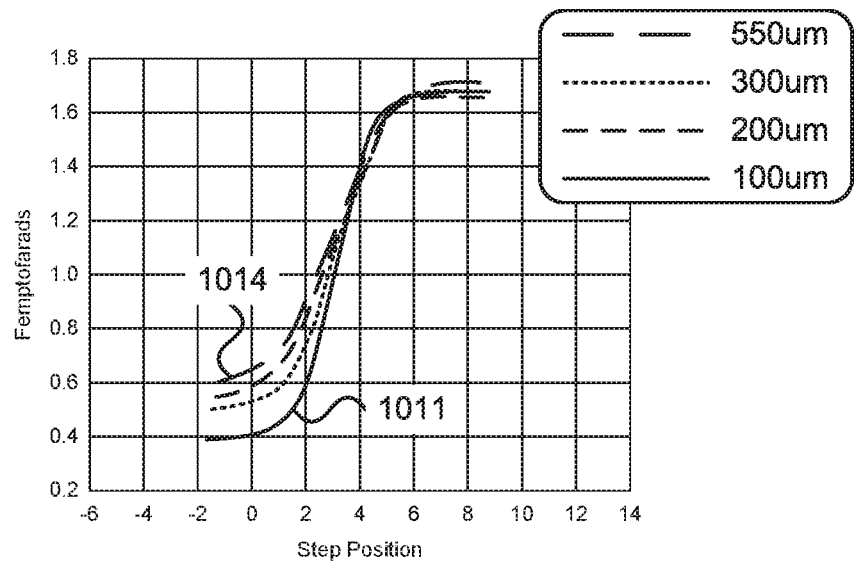
FIG. 10B is a graph illustrating measured capacitance according to an embodiment.

FIGS. 10A and 10B further illustrate an example of the effect of anisotropic conductive material on the imaging of a finger by a fingerprint sensor using self-capacitance. In the graphs of FIGS. 10A and 10B, the y-axes represent the measured capacitance in femtofarads (fF). Position 0 on the x-axes represents a transition between a valley of an imaged fingerprint and a ridge. The graphs illustrate the change in measured capacitance between a fingerprint valley and a fingerprint ridge using overlay materials of varying thickness (100 μm-550 μm) which are in contact with both the fingerprint and the fingerprint sensor surface. FIG. 10A illustrates the change in measured capacitance using overly material without pillars. Line 1001 indicates the measured capacitance of an imaged fingerprint where the overlay material is 100 μm thick. At x-axis position −2, corresponding to a valley, the measured capacitance on line 1001 is approximately 0.6 fF. At x-axis position 6, corresponding to a ridge, the measured capacitance of line 1001 is approximately 1.7 fF. Thus, the measured change in capacitance of line 1001 is approximately 1.1 fF. Line 1004 indicates the measured capacitance of an imaged fingerprint where the overlay material is 550 μm. At x-axis position −2, corresponding to a valley, the measured capacitance of line 1004 is approximately 0.35 fF. At x-axis position 6, corresponding to a ridge, the measured capacitance of line 1004 is approximately 0.40 fF. Thus, the measured change in capacitance of line 1004 is approximately 0.05 fF.

FIG. 10B illustrates an example of the change in measured capacitance using overly material with pillars. Line 1011 indicates the measured capacitance of an imaged fingerprint where the overlay material with pillars is 100 μm. At x-axis position −2, corresponding to a valley, the measured capacitance of line 1011 is approximately 0.4 fF. At x-axis position 6, corresponding to a ridge, the measured capacitance of line 1011 is approximately 1.7 fF. Thus, the measured change in capacitance of line 1011 is approximately 1.3 fF. Line 1014 indicates the measured capacitance of an imaged fingerprint where the overlay material with pillars is 550 μm. At x-axis position −2, corresponding to a valley, the measured capacitance of line 1014 is approximately 0.6 fF. At x-axis position 6, corresponding to a ridge, the measured capacitance of line 1014 is approximately 1.7 fF. Thus, the measured change in capacitance is approximately 1.1 fF.

As shown in FIGS. 10A and 10B, the measured change in capacitance using conventional material (without pillars) decreases significantly as the overlay thickness increases. The measured change in capacitance does not decrease as much using material with pillars as the overlay thickness increases. In other words, the pillars act like an electric field guide that increases the capacitive coupling of fingerprint features to the sense elements, reducing the decrease in the measured change in capacitance due to proximity of fingerprint features such as ridges through a thick overlay. The use of an overlay with pillars thus substantially increases the thickness of the overlay material through which the fingerprint sensor may accurately image a fingerprint.

Figure 11A:
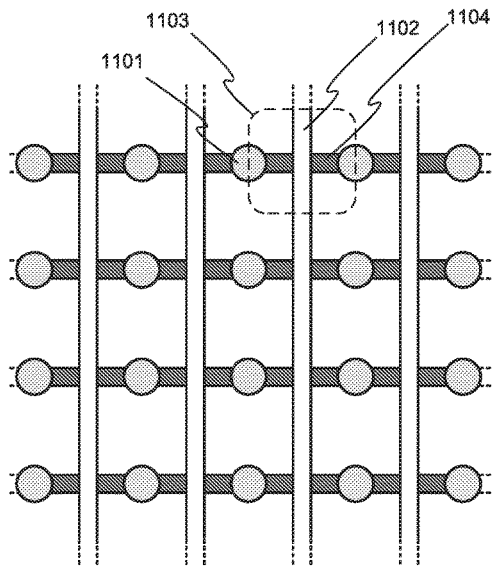
FIGS. 11A-11I illustrate arrangements of pillars according to various embodiments.
Figure 11B:
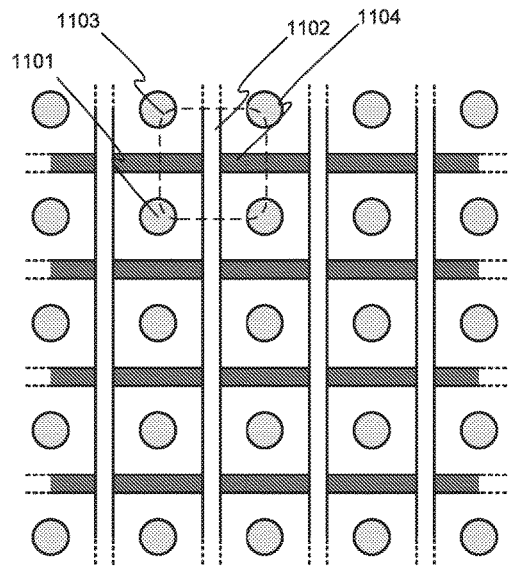
Figure 11C:
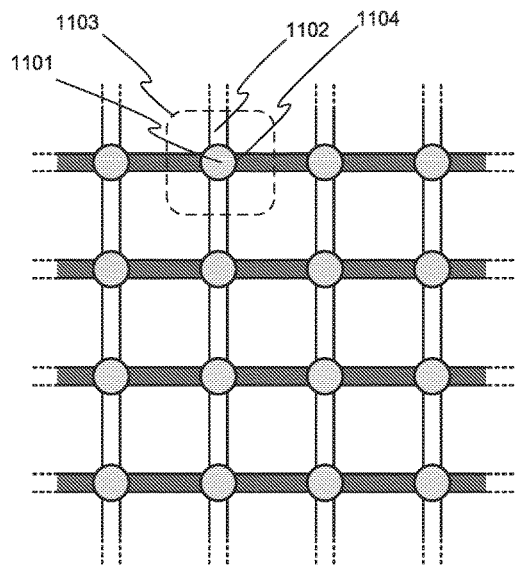
Figure 11D:
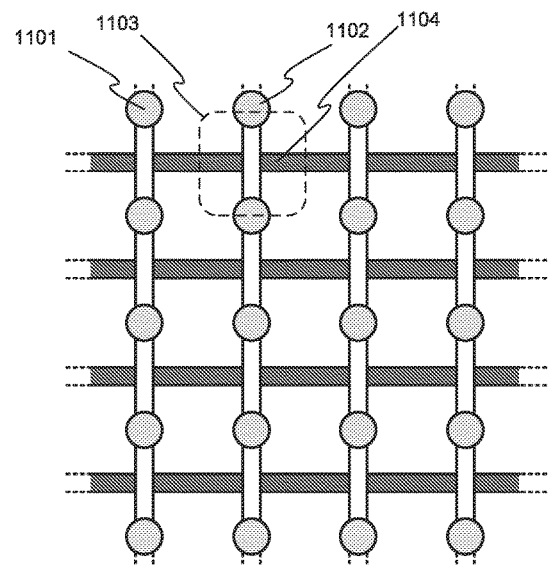
Figure 11E:
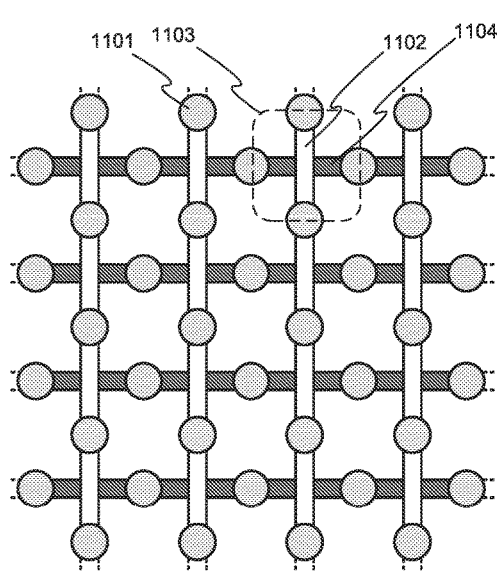
Figure 11F:
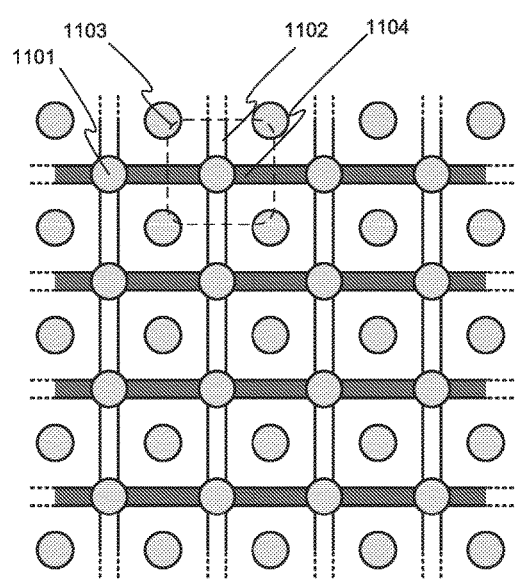
Figure 11G:
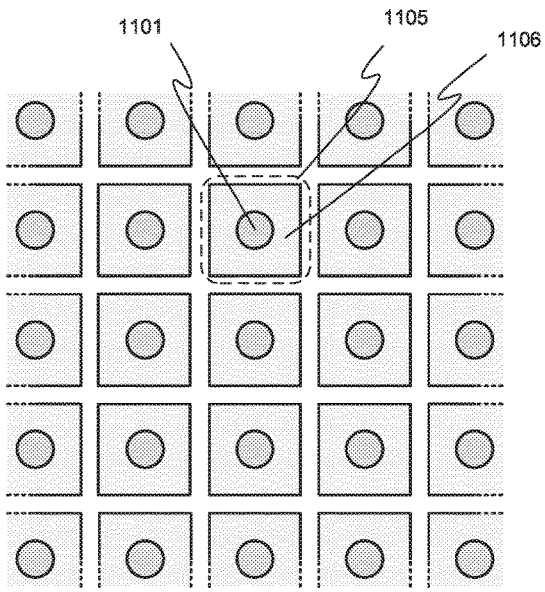
Figure 11H:
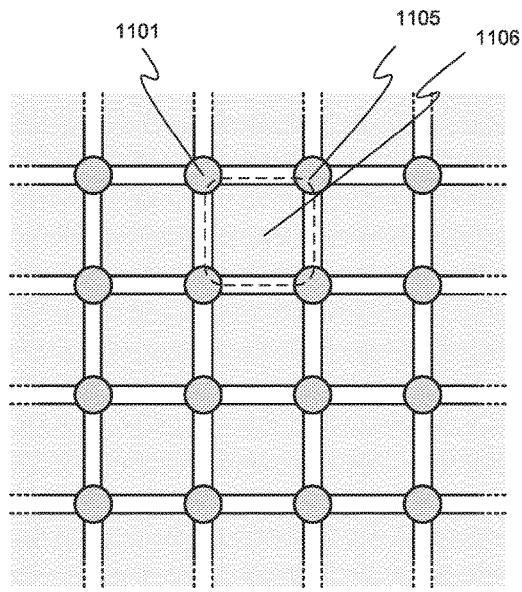
Figure 11I:
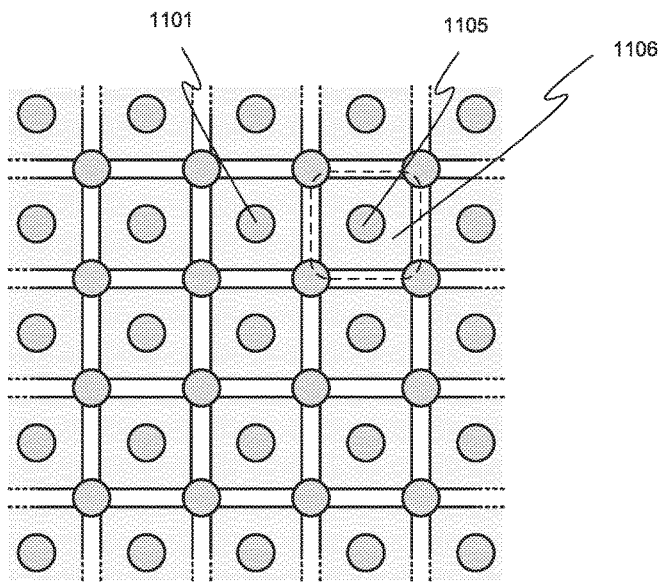

One aspect of the use of anisotropic conductive material with pillars for fingerprint sensing is the relative density of the pillars compared to the sense elements in the fingerprint sensor. In a fingerprint sensor, the pitch of the sense elements may be small enough that each fingerprint feature may be detected by a minimum number of capacitive sense elements. Using anisotropic conductive material, the density of pillars may be equal to the desired number of sense elements that may detect each fingerprint feature. In some embodiments the pillars may be symmetrically arranged. FIGS. 11A-D illustrate four symmetric arrangements of pillars 1101 with a uniform density of one pillar per mutual capacitance sense element 1103, sense element 1103 comprising the intersection of Rx electrode 1102 and Tx electrode 1104. FIGS. 11E-F illustrate two symmetric arrangements of pillars with a uniform density of two pillars 1101 per mutual capacitance sense element 1103, sense element 1103 comprising the intersection of Rx electrode 1102 and Tx electrode 1104. FIGS. 11G-H illustrate two symmetric arrangements of pillars 1101 with a uniform density of one pillar per self capacitance sense element 1105, sense element 1105 comprising electrode 1106. FIG. 11I illustrates a symmetric arrangement of pillars 1101 with a uniform density of two pillars per self capacitance sense element 1105, sense element 1105 comprising electrode 1106. It is to be understood that anisotropic material may comprise pillars with a relative density of more than two pillars per capacitive sense element for both mutual capacitance and self capacitance.

The accuracy of fingerprint imaging increases as the number of capacitive sense elements that may detect each fingerprint features increases. Increasing the density of pillars relative to capacitive sense elements increases the number of sense elements that may couple to each fingerprint feature strongly enough to detect the fingerprint feature. Thus, increasing the density of pillars increases the accuracy of fingerprint imaging through an overlay. Increasing the density of pillars also increases the thickness of an overlay that may enable accurate imaging of a fingerprint. As the density of pillars relative to capacitive sense elements decreases, the effect of the alignment of pillars to sense elements increases. In an embodiment where there is one pillar for each capacitance sense element, precise alignment of each pillar to a sense element increases the coupling of fingerprint features to each sense element, thus increasing the accuracy of fingerprint imaging. In a specific embodiment where there is one pillar for each capacitance sense element, centering the pillars in each unit cell provides the most effective conductive coupling and the most accurate fingerprint imaging. In an embodiment where there is less than one pillar for each capacitance sense element, accuracy of fingerprint imaging through an overlay is less than embodiments with one or more pillars for each capacitance sense element; however, accuracy of fingerprint imaging through an overlay with less than one pillar for each capacitance sense element is greater than accuracy of fingerprint imaging through an overlay without pillars.

Figure 12:
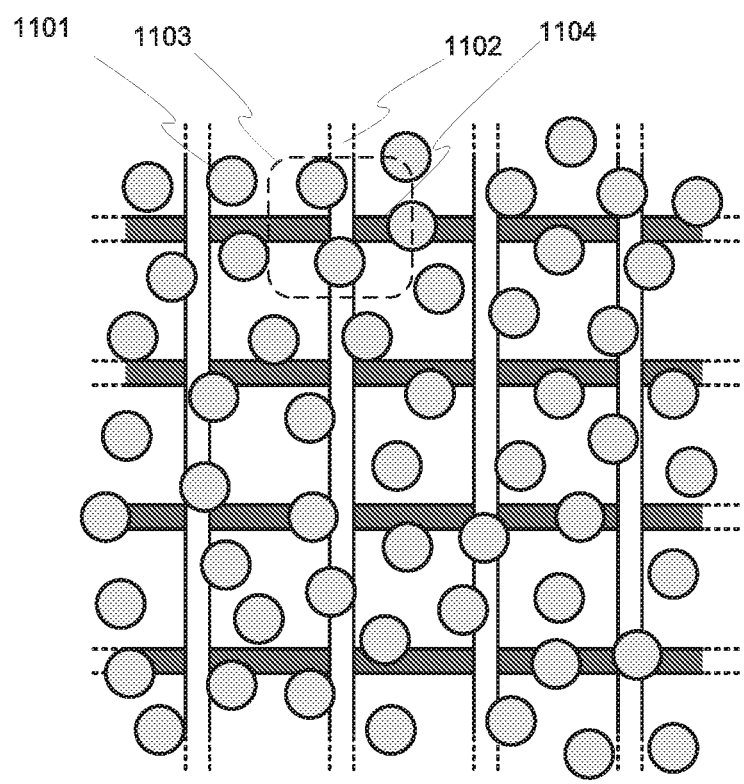
FIG. 12 illustrates an arrangement of pillars according to an embodiment.

In some embodiments, the pillars may have an asymmetric arrangement. In a specific embodiment, the pillars may have a random, asymmetric arrangement. An asymmetric arrangement of pillars may be desirable for ease of fabrication. An asymmetric arrangement of pillars may be desirable in flexible material, to allow the material to flex yet still provide effective conductive coupling through the pillars. When the pillars have an asymmetric arrangement, the fingerprint sensor may more accurately image a fingerprint when the asymmetric pillars have a uniform distribution density. When the pillars have an asymmetric arrangement, increasing the density of pillars relative to capacitive sense elements increases the number of sense elements that may couple to each fingerprint feature strongly enough to detect the fingerprint feature. Thus increasing the density of asymmetrically arranged pillars increases the accuracy of fingerprint imaging. FIG. 12 illustrates a random arrangement of pillars 1101 with a uniform distribution density of pillars per mutual capacitance sense element 1103. It is to be understood that a fingerprint sensor may also more accurately image a fingerprint when the asymmetric pillars have a uniform distribution density per self capacitance sense element.

Enclosure and Overlay Embodiments

Figure 13A:
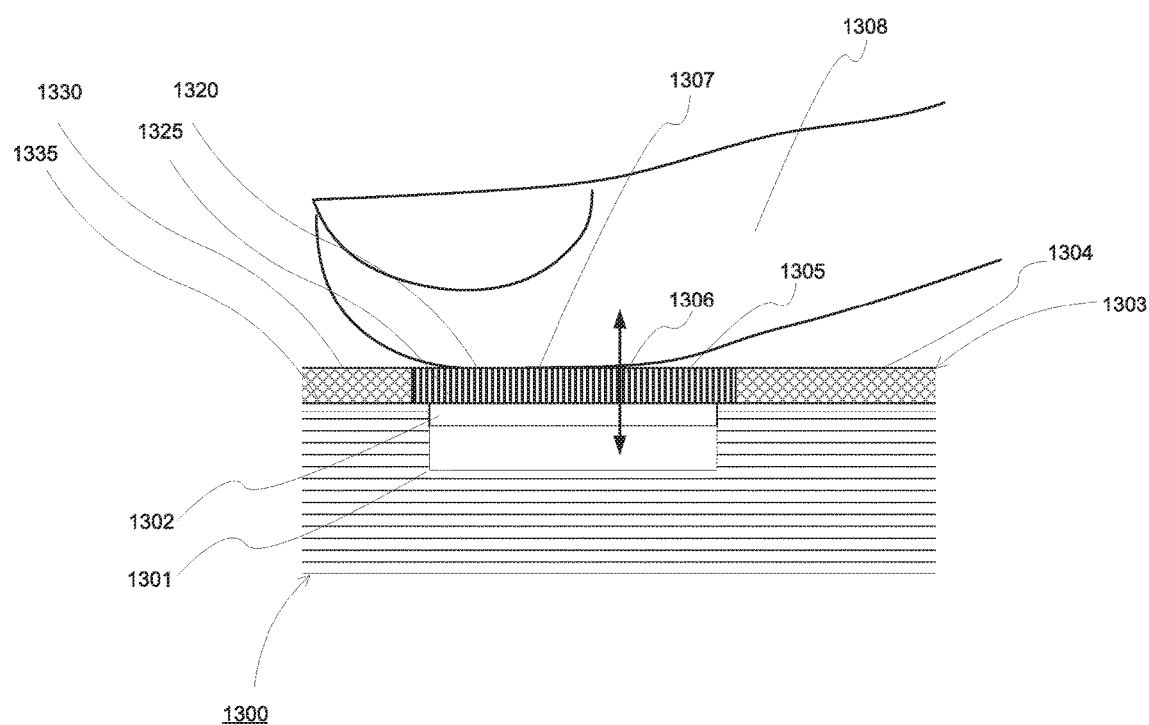
FIG. 13A-13C illustrates a system comprising an overlay, a fingerprint, and a fingerprint sensor according to various embodiments.

FIG. 13A illustrates an embodiment of an overlay comprising anisotropic conductive material disposed between a fingerprint and a fingerprint sensor. Device 1300 comprises fingerprint sensor 1301. Fingerprint sensor 1301 comprises sensor surface 1302. Overlay 1303 comprises intervening material 1304, which is configured to make contact with both fingerprint sensor surface 1302 and finger 1308. Anisotropic conductive material 1305 may be fabricated or inserted in the area of intervening material 1304 which is configured to contact both fingerprint sensor surface 1302 and finger pad 1307. In an embodiment, anisotropic conductive material 1305 may be fabricated or inserted in intervening material 1304 such that surface 1320 of anisotropic conductive material 1305 may be substantially level with surface 1330 of intervening material 1304, and such that surface 1325 of anisotropic conductive material 1305 is substantially level with surface 1335 of intervening material 1304. The direction of increased conductivity of anisotropic conductive material 1305 may be substantially orthogonal to surface 1320 and 1325 and is indicated by arrow 1306. Overlay 1303 may comprise rigid material such as glass, plastic, or ceramic. Overlay 1303 may comprise flexible material such as film or fabric. In an embodiment, some portions of overlay 1303 may be rigid while some portions may be flexible. Overlay 1303 may protect the device 1300 from harmful environmental factors, such as cold or water, and harmful physical factors, such as impacts, projectile objects, and corrosive chemicals.

Figure 13B:
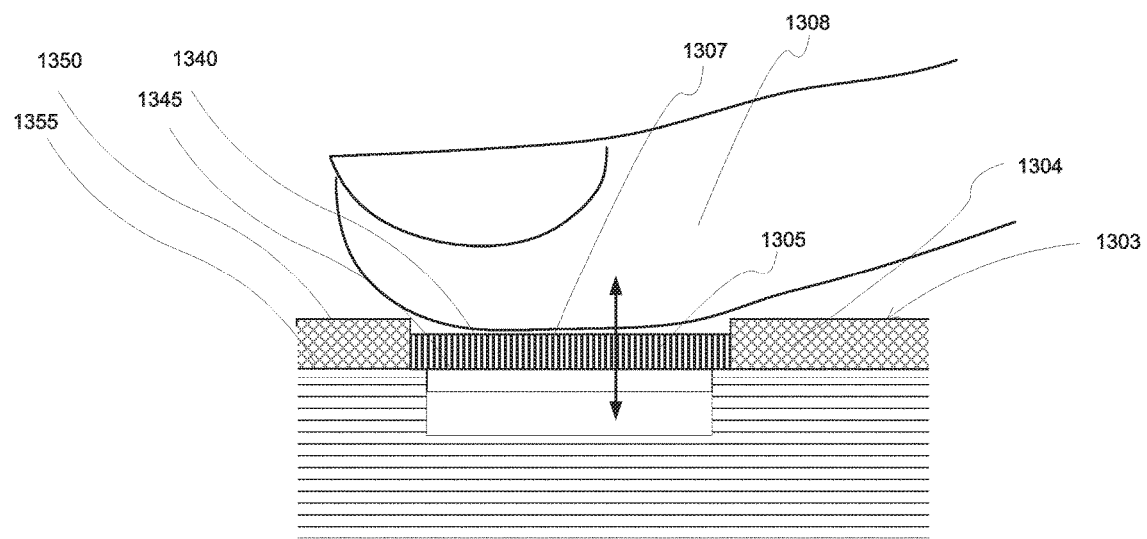

FIG. 13B illustrates an embodiment of overlay 1303 where anisotropic conductive material 1305 may be fabricated or inserted in intervening material 1304 such that surface 1345 of anisotropic conductive material 1305 is substantially level with surface 1355 of intervening material 1304, and such that surface 1340 of anisotropic conductive material 1305 is at a different level than surface 1350 of intervening material 1304. In the embodiment of FIG. 13B, surface 1350 of intervening material 1304 may be higher than surface 1340 of anisotropic conductive material 1305. In another embodiment, surface 1350 of intervening material 1304 may be lower than surface 1340 of anisotropic conductive material 1305. In other embodiments, surface 1340 of anisotropic conductive material 1305 may be partially covered by surface 1350 of intervening material 1304. Different surface levels of intervening material 1304 and anisotropic conductive material 1305 may provide tactile feedback, or a "guide," for placement of finger pad 1307 of finger 1308.

Figure 13C:
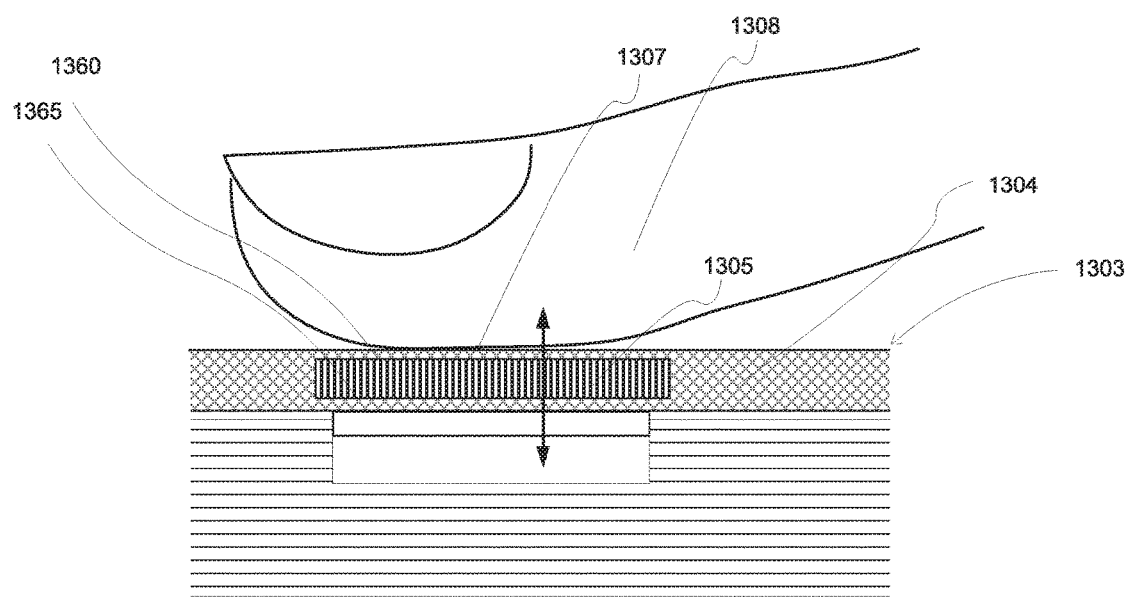

FIG. 13C illustrates an embodiment of overlay 1303 where anisotropic conductive material 1305 may be fabricated or inserted in intervening material 1304 such that anisotropic conductive material 1305 may be surrounded by intervening material 1304. In the embodiment of FIG. 13C, anisotropic conductive material 1305 may completely surrounded by intervening material 1304. In another embodiment, surface 1360 of anisotropic conductive material 1305 may be completely covered by of intervening material 1304, and surface 1365 of anisotropic conductive material 1305 may not be covered by intervening material 1304 (as illustrated by surface 1325 in FIG. 13A and surface 1345 in FIG. 13B). In another embodiment, surface 1365 of anisotropic material 1305 may be completely covered by of intervening material 1304, and surface 1360 of anisotropic material 1305 may not be covered by intervening material 1304 (as illustrated by surface 1320 in FIG. 13A and surface 1340 in FIG. 13B).

As illustrated in FIGS. 2 and 3, device 1300 may include a fingerprint controller (not shown), which may be configured to convert measured capacitance of fingerprint sensor 1301 into fingerprint data. Device 1300 may comprise a processor (not shown) which may further process fingerprint data or store fingerprint data in a memory. Device 1300 may comprise a memory (not shown) to store fingerprint data. In other embodiments, device 1300 may be configured to communicate with a controller, processor, or memory located in another device.

Figure 14:
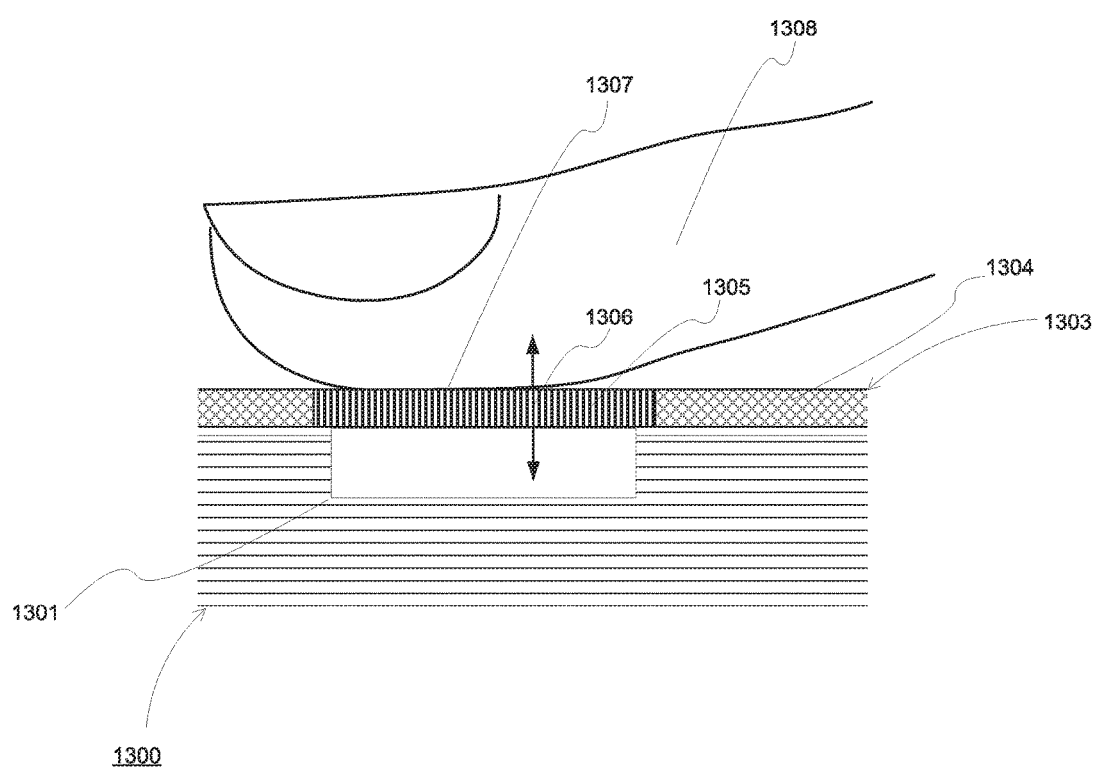
FIG. 14 illustrates a system comprising an overlay, a fingerprint, and a fingerprint sensor according to an embodiment.

FIG. 14 illustrates a system comprising similar elements as FIG. 13. FIG. 14 differs from FIG. 13 in that it does not include a fingerprint sensor surface corresponding to sensor surface 1302 in FIG. 13. In this embodiment, anisotropic conductive material 1305 may act as a protective cover for fingerprint sensor 1301.

In the above embodiments, overlay 1303 may configured to substantially cover and be in direct contact with a screen of device 1300, such as screen 102 in FIG. 1. The screen may comprise a display, a touch screen which is configured to measure and respond to changes in capacitance on and/or between electrodes arranged beneath the surface of the screen, and a fingerprint sensor. Overlay 1300 may protect the screen against harmful environmental and physical factors. Overlay 1300 may allow touch sensors to respond to a touch in areas of the device surface other than the fingerprint sensor but may not allow fingerprint sensor 1301 to accurately image the fingerprint. Conventional overlays such as screen protectors may leave an opening or "cutout" for a fingerprint sensor (including a finger printer sensor surface which protects the fingerprint sensor). However, a cutout may reduce the aesthetic appeal of device 1301 and leave a portion of the screen surface vulnerable to harmful environmental and physical factors. Using the systems of FIGS. 13 and 14, fingerprint sensor 1301 may image the fingerprint through the anisotropic conductive material 1305 fabricated on or inserted into overlay 1303, improving the aesthetic appeal of device 1300 and protecting the screen and fingerprint sensor 1301 against harmful factors. In one embodiment, fingerprint sensor 1301 does not have a fingerprint sensor surface; anisotropic conductive material 1305 protects fingerprint sensor 1301, as illustrated in FIG. 14. The overlay material, including anisotropic conductive material 1305, may be rigid or flexible. In an embodiment, some portions of overlay 1303 may be rigid while some portions may be flexible.

Figure 15:
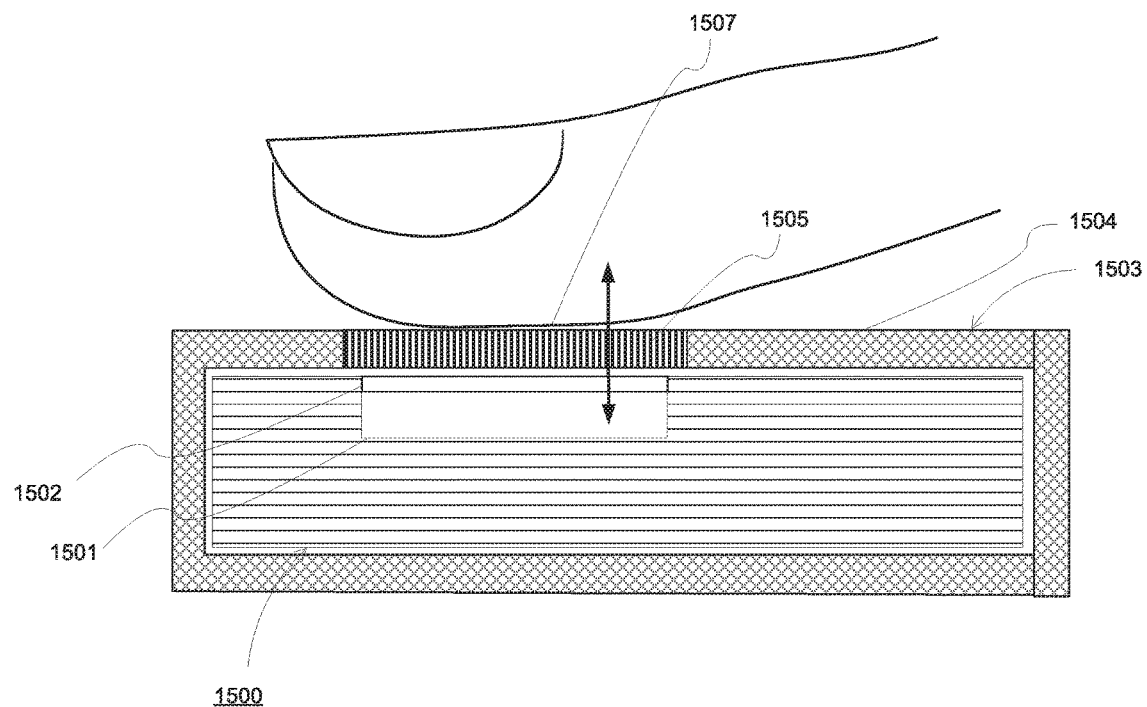
FIG. 15 illustrates a system comprising an enclosure, a fingerprint, and a fingerprint sensor according to an embodiment.

FIG. 15 illustrates elements similar to the elements of FIG. 13. Device 1500 of FIG. 15 differs from device 1300 in FIG. 13 in that device 1500 may be surrounded by enclosure 1503. In an embodiment, enclosure 1503 may completely enclose device 1500. In another embodiment, enclosure 1503 may partially enclose device 1500. Enclosure 1503 may comprise anisotropic conductive material 1505 between finger pad 1507 and fingerprint sensor 1501. The direction of increased conductivity of anisotropic conductive material 1505 is indicated by arrow 1506. Enclosure 1503 may comprise rigid material such as glass, plastic, or ceramic. Enclosure 1503 may comprise flexible material such as film or fabric. Enclosure 1503 may protect the device from harmful environmental factors, such as cold or water, and harmful physical factors, such as impacts, projectile objects, and corrosive chemicals. In various embodiments, Fingerprint sensor 1501 may not include fingerprint sensor 1502 surface; anisotropic conductive material 1505 fabricated on or inserted in enclosure 1503 may act as a protective cover for fingerprint sensor 1501.

In an embodiment, device 1500 of FIG. 15 may comprise a mobile communication device such as a smartphone or cellphone, or a computing device such as a personal digital assistants, smartwatch, mapping device, tablet, or audio player. Enclosure 1503 may comprise a case to protect device 1500 from harmful environmental factors, such as cold or water, and harmful physical factors, such as impacts, projectile objects, and corrosive chemicals.

In a specific embodiment, enclosure 1503 may be directed to use for a mobile communications device or computing device during exercise activity, such as an armband holder or a water resistant case. The computing or mobile communications device may run application software related to the exercise activity, such as mapping software or fitness training software, or software to play an audio program. In an embodiment, device 1500 may be configured to enter a lower power mode after a period of time. The user may want to awaken device 1500 from a lower power mode using the fingerprint sensor in order to interact with the software. In another embodiment, the user may want to activate functions in the software, for example, starting a timer or skipping a song, using the fingerprint sensor in order to interact with the software. Removing device 1500 from enclosure 1503 may be inconvenient to the user and and/or risk damaging the device. Using the system of FIG. 15, fingerprint sensor 1501 may image the fingerprint through anisotropic conducting material 1505 without removing device 1500 from enclosure 1503. In an embodiment, intervening material 1505 may allow touch sensors to respond to a touch in other areas of the device surface other than the fingerprint sensor but may not allow fingerprint sensor 1501 to accurately image the fingerprint.

In an embodiment, device 1500 of FIG. 15 may comprise a computing device such as a notebook computer or tablet computer. Enclosure 1503 may comprise a case to house device 1500 to protect against harmful environmental or physical factors. Using the system of FIG. 15, fingerprint sensor 1501 may image the fingerprint through anisotropic conductive material 1505 without removing device 1500 from enclosure 1503.

In an embodiment, device 1500 of FIG. 15 may comprise an engine-start module for automotive equipment such as cars, trucks, or motorcycles. In a specific embodiment, automotive equipment may comprise a motorcycle or other vehicle with a driver compartment which not enclosed. Enclosure 1503 may comprise a protective film or cover to protect against harmful environmental and physical factors. Using the system of FIG. 15, fingerprint sensor 1501 may image the fingerprint through anisotropic conductive material 1505 without removing device 1500 from enclosure 1503.

In an embodiment device 1500 of FIG. 15 may comprise a control switch for home white goods such as an appliance or security system. In a specific embodiment, white goods may comprise an appliance which uses water, such as a dish or laundry washing machine, and which may incorporate a fingerprint sensor in a control panel that may be exposed to water. Enclosure 1503 may comprise a protective film or cover to protect the control panel against damage or malfunction due to water. Using the system of FIG. 15, fingerprint 1501 sensor may image the fingerprint through anisotropic conductive material 1505 without removing device 1500 from enclosure 1503.

In an embodiment, device 1500 of FIG. 15 may comprise an entry system module such as for home or automotive entry. In a specific embodiment, the entry system module may be exposed to harmful factors such as an outdoor environment or an industrial environment. Enclosure 1503 may comprise a protective film or cover to protect against harmful environmental and physical factors. Using the system of FIG. 15, fingerprint sensor 1501 may image the fingerprint through anisotropic conductive material 1505 without removing device 1500 from enclosure 1503.

Glove and Finger Cot Embodiments

Figure 16:
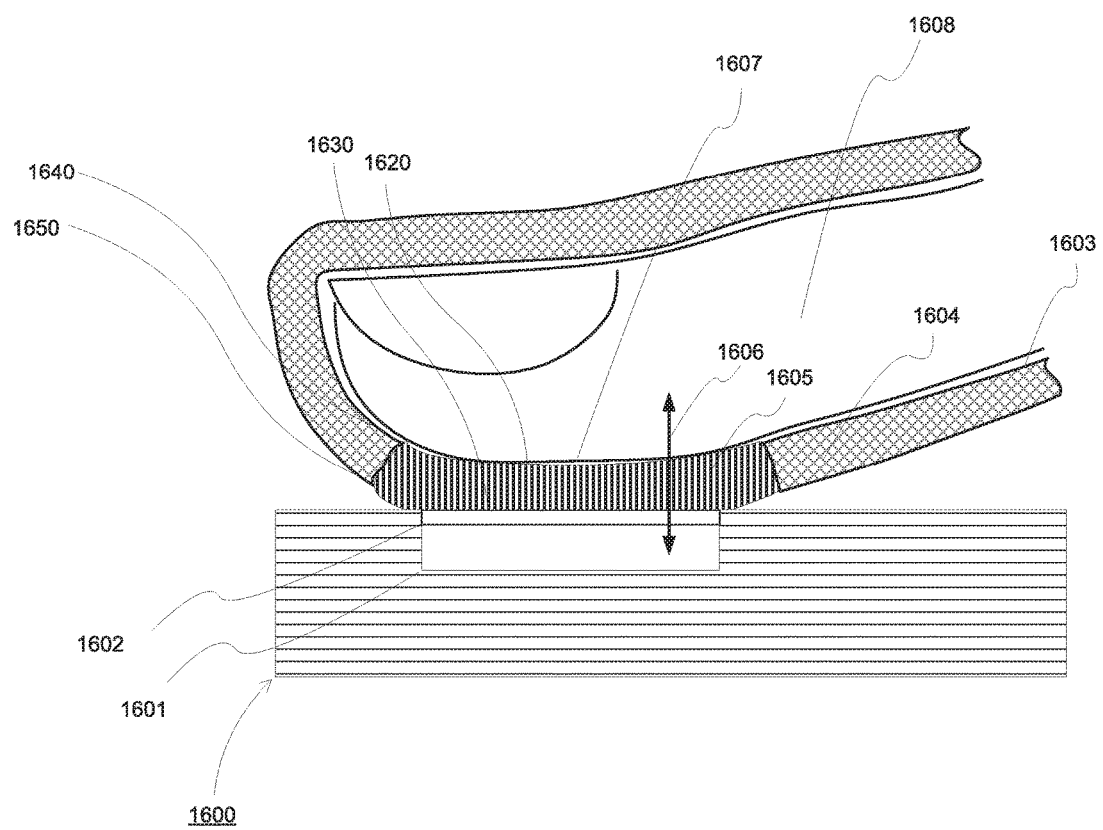
FIG. 16 illustrates a system comprising a glove, a fingerprint, and a fingerprint sensor according to an embodiment.

FIG. 16 illustrates a glove or other hand enclosure 1603 comprising an intervening material 1604, which comprises anisotropic conductive material 1605 disposed between finger pad 1607 of finger 1608 and fingerprint sensor 1601, fingerprint sensor 1601 comprising sensor surface 1602. In an embodiment, anisotropic conductive material 1605 may be fabricated or inserted in intervening material 1604 such that surface 1620 of anisotropic conductive material 1605 is substantially level with surface 1640 of intervening material 1604, and such that surface 1630 of anisotropic conductive material 1605 is substantially level with surface 1650 of intervening material 1604. In another embodiment, surface 1620 of anisotropic conductive material 1605 may be at a substantially different level than surface 1640 of intervening material 1604, and such surface 1630 of anisotropic conductive material 1605 may be at a substantially different level than surface 1650 of intervening material 1604. In another embodiment, anisotropic conductive material 1605 may be surrounded by intervening material 1604. The direction of increased conductivity 1606 of the anisotropic conductive material 1605 is substantially orthogonal to surface 1620 and 1630 is indicated by arrow 1606.

As illustrated in FIGS. 2 and 3, device 1600 may include a fingerprint controller (not shown), which may be configured to convert measured capacitance of fingerprint sensor 1601 into fingerprint data. Device 1600 may comprise a processor (not processor) which may further process fingerprint data or store fingerprint data in a memory. Device 1600 may comprise a memory (not shown) to store fingerprint data. In other embodiments, device 1600 may be configured to communicate with a controller, processor, or memory located in another device.

Figure 17:
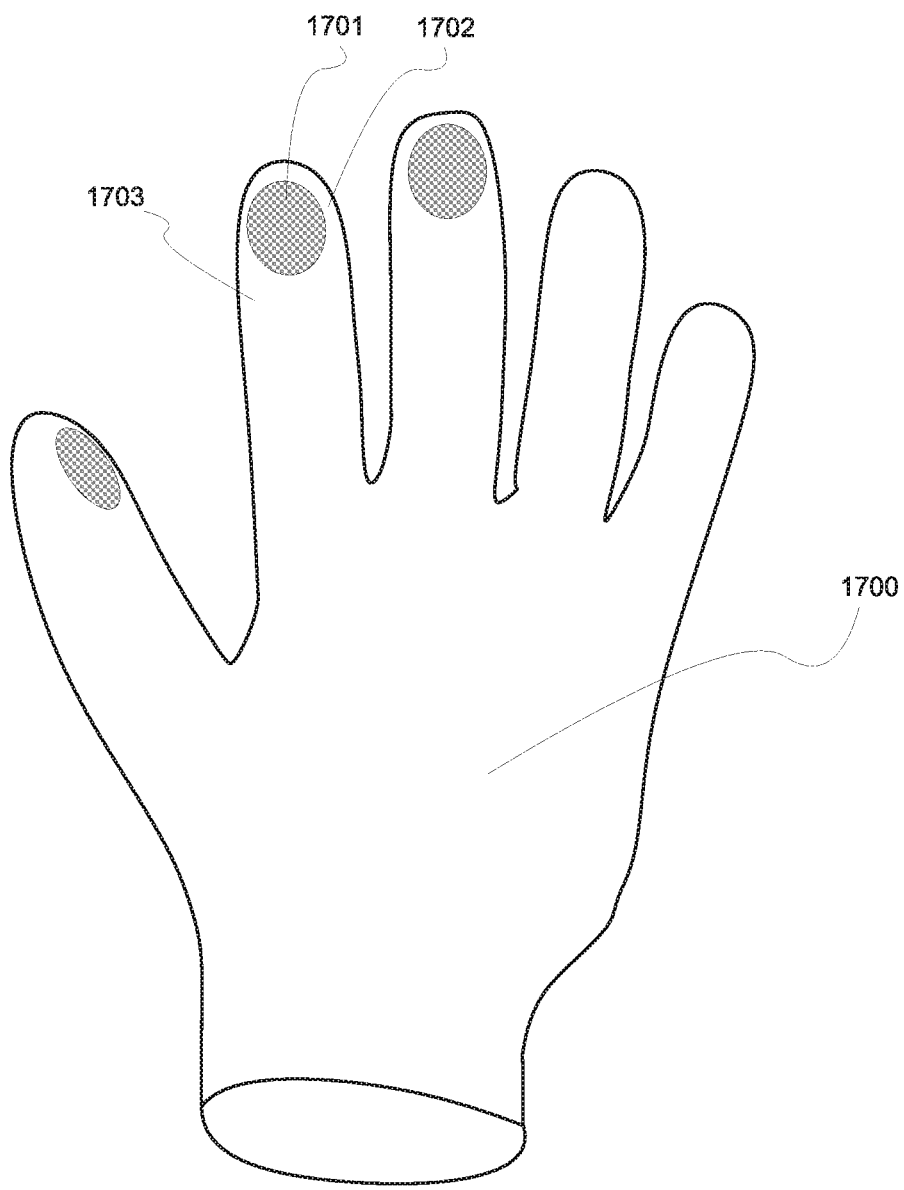
FIG. 17 illustrates a glove comprising anisotropic conductive material according to an embodiment.

FIG. 17 illustrates a glove 1700 comprising anisotropic conductive material 1701 fabricated or inserted in the glove material in the fingertip areas 1702 corresponding to the location of a finger pad (1607 of FIG. 16) on a finger 1703. As illustrated in FIGS. 16 and 17, anisotropic conductive material 1701 may be fabricated or inserted as patches in glove 1700 such that the direction of conductivity is perpendicular to the surface of finger pad 1607. When finger 1608 or 1703 applies fingertip 1702 of glove 1700 to fingerprint sensor 1601, anisotropic conductive material 1701 may contact both finger pad 1607 and fingerprint sensor surface 1602, enabling fingerprint sensor 1601 to accurately image the fingerprint. In an embodiment, the patches may be approximately the size of a finger pad. Anisotropic conductive material 1605 may be flexible at the geometry of a finger (i.e. can conform to the curvature of a finger) but rigid enough that its surface is not deformed by the fingerprint ridge/valley structure.

In one embodiment, glove 1700 may be directed to use for exercise activity, such as running, hiking, skiing, etc. Glove 1700 may be designed to protect the hand from harmful or uncomfortable environmental factors, such as wet and cold, or harmful or uncomfortable physical factors such as cuts or impacts. The device may be a computing device configured to run application software related to the exercise activity, such as mapping software or fitness training software, or the computing device may run software to play an audio program. In an embodiment, the device may be configured to enter a lower power mode after a period of time. The user may want wake the device from lower power mode using the fingerprint sensor to interact with device software. In another embodiment, the user may want to activate functions in the software, for example, starting a timer or skipping a song, using the fingerprint sensor in order to interact with the software. Removing glove 1700 may be inconvenient and possibly harmful to the user. Using the system of FIG. 16 and FIG. 17, fingerprint sensor 1601 may image the fingerprint through anisotropic conducting material 1701 fabricated on or inserted in the glove 1700. In an embodiment, intervening material 1603 may allow conventional touch sensors to respond to a touch in other areas of the device surface.

In an embodiment, glove 1700 may be directed to use for in an industrial environment. Glove 1700 may be designed to protect the hand from harmful or uncomfortable environmental factors, such as wet, cold or heat, or dangerous chemicals or gases, or harmful or uncomfortable physical factors such as cuts or impacts. Using the system of FIGS. 16 and 17, the fingerprint sensor 1601 may image the fingerprint from finger pad 1607 through anisotropic conducting material 1701 fabricated on or inserted in glove 1700.

In an embodiment, glove 1700 may be directed to use in an outdoor environment. In an embodiment, glove 1700 may be worn by a user attempting to start automotive equipment comprising a motorcycle or other vehicle with a driver compartment which not enclosed. In another embodiment, glove 1700 may be may be worn by a user attempting to gain access to a building or automobile, for example. In such cases, glove 1700 may be designed to protect the hand from harmful or uncomfortable environmental factors, such as wet, cold, or heat, or harmful or uncomfortable physical factors such as cuts or impacts. Using the system of FIGS. 16 and 17, fingerprint sensor 1601 may image the fingerprint from finger pad 1607 through anisotropic conducting material 1701 fabricated or inserted in the glove.

In an embodiment, a glove may be directed to use in a medical environment. The glove may be designed to protect the hand from harmful or uncomfortable environmental factors, such as wet, cold, or heat, or harmful physical factors such as cuts, impacts, or bodily fluids. Using the system of FIGS. 16 and 17, fingerprint sensor 1601 may image the fingerprint from finger pad 1607 through anisotropic conducting material 1701 fabricated or inserted in the glove.

Figure 18:
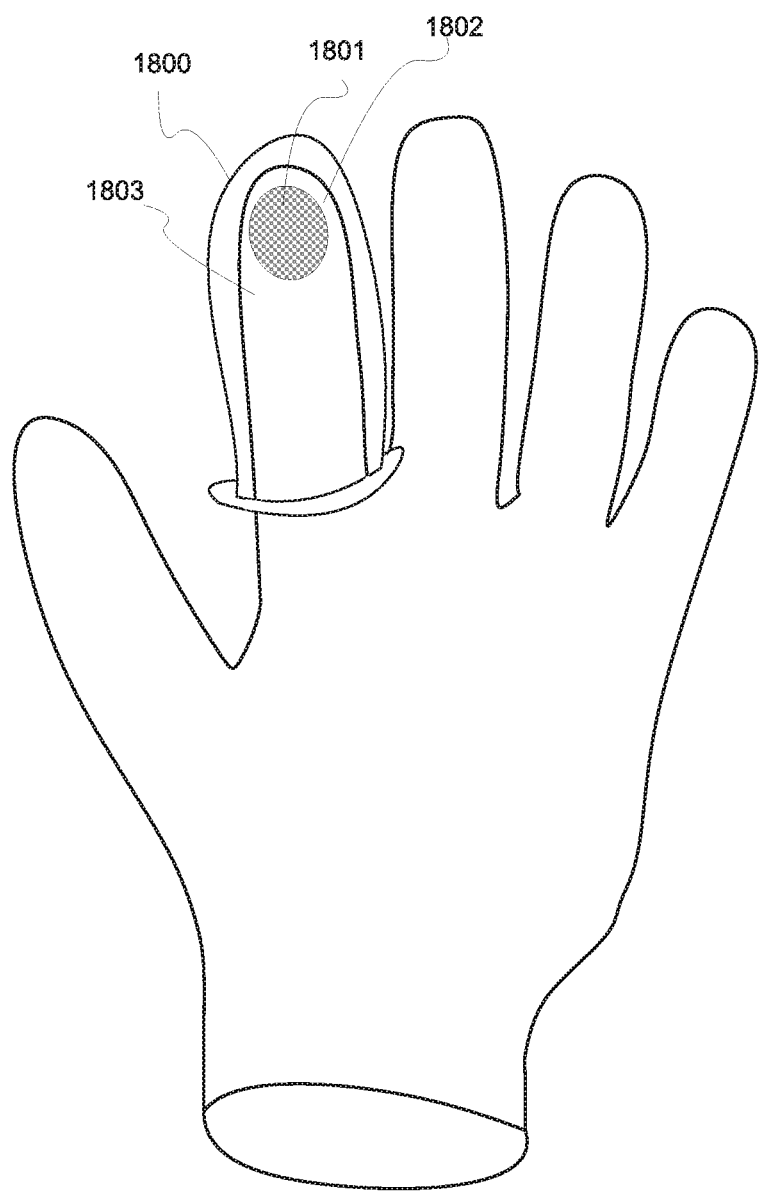
FIG. 18 illustrates a finger cot comprising anisotropic conductive material according to an embodiment.

In all of the above embodiments, the hand enclosure could comprise a finger cot or other finger enclosure, as illustrated in FIG. 18. In an embodiment, finger cot 1800 comprises anisotropic conductive material 1801 fabricated or inserted in fingertip area 1802 corresponding to the location of finger pad (1607 of FIG. 16) on finger 1803 inserted in finger cot 1800. As illustrated in FIGS. 16 and 18, anisotropic conductive material 1801 may be fabricated or inserted as patches in finger cot 1800 such that the direction of conductivity is perpendicular to the surface of finger pad 1607. When finger 1803 applies fingertip 1802 of finger cot 1800 to fingerprint sensor 1601, anisotropic conductive material 1801 contacts both finger pad 1607 and fingerprint sensor 1601, enabling fingerprint sensor 1601 to accurately image the fingerprint. In an embodiment, the patches may be approximately the size of a finger pad. Anisotropic conductive material 1801 may be flexible at the geometry of a finger, but rigid enough that its surface is not deformed by the fingerprint ridge/valley structure In an embodiment, finger cot 1800 may be directed to use during recreational activity, such as fly fishing or sewing. In an embodiment, finger cot 1800 may be directed to use in a medical environment. Finger cot 1800 may be designed to protect the finger harmful or uncomfortable physical factors such as cuts or jabs.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "integrating," "comparing," "balancing," "measuring," "performing," "accumulating," "controlling," "converting," "accumulating," "sampling," "storing," "coupling," "varying," "buffering," "applying," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and circuits presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A sensor-compatible overlay, comprising:
   a first portion comprising a first surface and a second surface; and
   a second portion disposed at least partly within the first portion, comprising a third surface and a fourth surface, wherein the second portion has:
   a first conductivity in a direction substantially orthogonal to the third surface and the fourth surface, and a second conductivity in at least one other direction, wherein the first conductivity is substantially greater than the second conductivity, and wherein the first conductivity is substantially static.

2. The sensor-compatible overlay of claim 1, wherein the third surface is substantially parallel with the first surface and the fourth surface is substantially parallel with the second surface.

3. The sensor-compatible overlay of claim 1, wherein the second portion is disposed entirely within the first portion such that the first portion completely surrounds the second portion.

4. The sensor-compatible overlay of claim 1, wherein the first surface is disposed to be adjacent to a conductive object and the second surface is disposed to be adjacent to a capacitive sensor.

5. The sensor-compatible overlay of claim 4, wherein the third surface is recessed from the first surface and is disposed to contact the conductive object.

6. The sensor-compatible overlay of claim 1, wherein the first portion comprises a flexible material.

7. The sensor-compatible overlay of claim 1, wherein the second portion comprises a flexible material.

8. The sensor-compatible overlay of claim 1, wherein the sensor-compatible overlay is configured to at least partially enclose a device comprising a conductive sensor.

9. The sensor-compatible material of claim 1, wherein the sensor-compatible overlay is incorporated in a glove.

10. A method of forming a sensor-compatible material comprising incorporating an anisotropic conductive material at least partly within a first material such that a first surface of the first material is substantially parallel to a third surface of the anisotropic conductive material and a second surface of the first material is substantially parallel to a fourth surface of the anisotropic conductive material, wherein the anisotropic conductive material comprises:
a first conductivity in a direction substantially orthogonal to the third surface and the fourth surface; and
a second conductivity in at least one other direction, wherein the first conductivity is substantially greater than the second conductivity; and
wherein the first conductivity is substantially fixed.

11. The method of claim 10, further comprising incorporating the anisotropic conductive material entirely within the first material such that the first material completely surrounds the anisotropic conductive material.

12. The method of claim 10, wherein incorporating the anisotropic conductive material further comprises inserting the anisotropic conductive material in the first material.

13. The method of claim 10, wherein the first surface is disposed to be adjacent to a conductive object and the second surface is disposed to be adjacent to a capacitive sensor.

14. The method of claim 13, wherein the third surface is recessed from the first surface and is disposed to contact the conductive object.

15. The method of claim 10, wherein the first material comprises a flexible material.

16. The method of claim 10, wherein the anisotropic conductive material comprises a flexible material.

17. The method of claim 10, further comprising configuring the sensor-compatible material to at least partially enclose a device comprising a capacitive sensor.

18. The method of claim 10, further comprising configuring the sensor-compatible material as a glove.

19. A system, comprising:
a capacitive sensor;
a sensor controller electrically coupled to the capacitive sensor; and
a protective cover, comprising:
a first surface and a second surface, wherein the first surface is disposed to be adjacent to the capacitive sensor; and
an anisotropic conductive material disposed at least partly within the first material comprising a third surface substantially parallel with the first surface and a fourth surface substantially parallel with the second surface, wherein the anisotropic conductive material comprises:
a first conductivity in a direction substantially orthogonal to the third surface and the fourth surface; and
a second conductivity in at least one other direction, wherein the first conductivity is substantially greater than the second conductivity; and
wherein the first conductivity is substantially unchanging.

20. The system of claim 19, wherein the anisotropic conductive material is disposed entirely within the first material such that the first material completely surrounds the anisotropic conductive material.

21. The system of claim 19, wherein the second surface is configured to be adjacent to a conductive object.

22. The system of claim 21, wherein the fourth surface is recessed from the second surface and is disposed to contact the conductive object.

23. The system of claim 19, wherein the conductive cover is configured to at least partially enclose the capacitive sensor and sensor controller.

24. The system of claim 19, wherein the capacitive sensor comprises a self capacitance sensor.

25. The system of claim 19, wherein the second surface is configured to be conformable to a shape of a conductive object.

26. The system of claim 19, wherein the fourth surface is configured to be conformable to a shape of a conductive object.

* * * * *